United States Patent
Gassull Pallàs et al.

(10) Patent No.: US 12,478,627 B2
(45) Date of Patent: Nov. 25, 2025

(54) IRSOGLADINE FOR THE TREATMENT OF EOSINOPHILIC GASTROINTESTINAL DISEASES

(71) Applicant: EPITHELION SCIENCE BIOTECH, S.L., Barcelona (ES)

(72) Inventors: Daniel Gassull Pallàs, Barcelona (ES); Miquel Àngel Gassull Duró, Barcelona (ES)

(73) Assignee: EPITHELION SCIENCE BIOTECH, S.L., Barcelona (ES)

( * ) Notice: Subject to any disclaimer, the term of this patent is extended or adjusted under 35 U.S.C. 154(b) by 965 days.

(21) Appl. No.: 17/616,614

(22) PCT Filed: Jun. 5, 2020

(86) PCT No.: PCT/EP2020/065660
§ 371 (c)(1),
(2) Date: Dec. 3, 2021

(87) PCT Pub. No.: WO2020/245382
PCT Pub. Date: Dec. 10, 2020

(65) Prior Publication Data
US 2022/0226333 A1    Jul. 21, 2022

(30) Foreign Application Priority Data
Jun. 7, 2019   (EP) ..................... 19382478

(51) Int. Cl.
*A61K 31/53*    (2006.01)
*A61P 1/04*    (2006.01)

(52) U.S. Cl.
CPC ............... *A61K 31/53* (2013.01); *A61P 1/04* (2018.01)

(58) Field of Classification Search
CPC ...... A61K 31/53; A61K 31/56; A61K 31/573; A61K 31/58; A61K 31/606; A61K 31/52; A61K 45/06; A61P 1/04; A61P 1/00; A61P 37/08
See application file for complete search history.

(56) References Cited

PUBLICATIONS

Tomii, Yoshifumi; Mimura, Kiyotaka; Honmura, Takuya; Ueda, Fusao. Effect of irsogladine on gastritis caused by Helicobacter pylori infection in Mongolian gerbils, Jpn. Pharmacol. Ther., 1997, 25(12):2925-2932 (Year: 1997).*
Wang W, Masu K, Tamura G, Suzuki K, Ohwada K, Okuyama K, Shirato K, Takayanagi M, Ohno I. Inhibition of eosinophil survival by a selective inhibitor of phosphodiesterase 4 via the induction of apoptosis. Biol Pharm Bull., 2005, 28(3):515-519 (Year: 2005).*
Takashi Kyoi, Kumiko Noda, Michiko Oka, Yojiro Ukai, Irsogladine, an anti-ulcer drug, suppresses superoxide production by inhibiting phosphodiesterase type 4 in human neutrophils, Life Sciences, 2004, 76(1): 71-83 (Year: 2004).*
Kawano Y, Imamura A, Nakamura T, Akaishi M, Satoh M, Hanawa T. Development and Characterization of Oral Spray for Stomatitis Containing Irsogladine Maleate. Chem. Pharm. Bull., 2016, 64(12):1659-1665 (Year: 2016).*
Mulder, D., Justinich, C. Understanding eosinophilic esophagitis: the cellular and molecular mechanisms of an emerging disease. Mucosal Immunol., 2011, 4:139-147 (Year: 2011).*
Dohil, Ranjan et al. Oral Viscous Budesonide Is Effective in Children With Eosinophilic Esophagitis in a Randomized, Placebo-Controlled Trial. Gastroenterology, 2010, 139(2):418-429.e1 (Year: 2010).*
International Search Report and Written Opinion mailed Aug. 18, 2020 for Application No. PCT/EP2020/065660, 12 pages.
Assa'ad, et al: "An antibody against IL-5 reduces numbers of esophageal intraepithelial eosinophils in children with eosinophilic esophagitis", Gastroenterology 2011; vol. 141(5), pp. 1593-1604.
Atkins, The ocassional Ebb and Flow between Eosinophilic Esophagitis and IgE-mediated food allergy, J Allergy Clin Imminol Pract. 2018; vol. 6, pp. 651-652.
Attwood, et al: "Esophageal Eosinophilia with Dysphagia. A Distinct Clinicopathologic Syndrome", Digestive Diseases and Sciences; Jan. 1, 1993; vol. 38(1), pp. 109-116.
Brandtzaeg, "Food allergy: separating the science from the mythology", Nat. Rev. Gastroenterol. Hepatol. Jul. 2010; vol. 7(7), pp. 380-400.
Caldwell, et al: "Histologic eosinophilic gastritis is a systemic disorder associated with blood and extragastric eosinophilia, TH2 immunity, and a unique gastric transcriptome", J Allergy Clin Immunol. 2014; vol. 134(5), pp. 1114-1124.
Clayton, et al: "Eosinophilic esophagitis in adults is associated with IgG4 and not mediated by IgE", Gastroenterology Sep. 2014; vol. 147(3), pp. 602-609.
Collins, et al: "Eosinophilic Gastrointestinal Disorders Pathology", Frontiers in Medicine; Jan. 15, 2018; vol. 4(261), pp. 1-8.

(Continued)

*Primary Examiner* — Joseph K McKane
*Assistant Examiner* — David M Shim
(74) *Attorney, Agent, or Firm* — Squire Patton Boggs (US) LLP

(57) ABSTRACT

The present invention provides Irsogladine or a pharmaceutically acceptable salt thereof for use in the treatment and/or prevention of eosinophilic gastrointestinal diseases in mammals. The invention is useful in the treatment of eosinophilic gastritis, eosinophilic gastroenteritis, eosinophilic duodenitis, eosinophilic enteritis, eosinophilic colitis, and in particular, eosinophilic esophagitis. The invention is particularly useful for inducing disease remission in acute inflammatory activity and long-term maintenance of remission as well. The Irsogladine of the invention can be administered in the form of a pharmaceutical composition, or more specifically, in the form of an oral and rectal pharmaceutical composition.

14 Claims, 18 Drawing Sheets

(56) References Cited

PUBLICATIONS

Collins, et al: "Cooperation between IL-5 and chemokine Eotaxin to induce eosinophil accumulation in vivo", J Exp Med; Oct. 1995; vol. 182, pp. 1169-1171.
Dellon, et al: "Updated international consensus diagnostic criteria for eosinophilic esophagitis; proceedings of The Agree conference", Gastroenterology; Oct. 2018; vol. 155, pp. 1022-1033; e10.
Dellon, et al: "The increasing incidence and prevalence of eosinophilic esophagitis outpaces changes in endoscopic and biopsy practice: National population-based estimates from Denmark", Aliment Pharmacol Ther.; Apr. 2015; vol. 41(7), pp. 662-670.
Foroughi, et al: "Anti-IgE treatment of eosinophil associated gastrointestinal disorders", J Allergy Clin Immunol.; Sep. 2007; vol. 120(3); pp. 594-601.
Galli, et al: "The development of allergic inflammation", Nature; Jul. 24, 2008; vol. 454(7203); pp. 445-454.
Golekoh, et al: "Adrenal insufficiency after Chronic Swallowed Glucocorticoid Therapy for Eosinophilic Esophagitis", The Journal of Pediatrics; Mar. 2016; vol. 170, pp. 240-245.
Goyal, et al: "Recent Discoveries and Emerging Therapeutics in Eosinophilic Esophagitis", World Journal of Gastrointestinal Pharmacology and Therapeutics; Feb. 6, 2016; vol. 7(1); pp. 21-23; XP055641171.
Haas, et al: "Clinical presentation of feeding dysfunction in children with Eosinophilic gastrointestinal disease", Immunol Allergy Clin North Am. 2009; vol. 29(1); pp. 65-75.
Harbison, et al: "The effect of a novel orally active selective PDE4 isoenzyme inhibitor (CDP840) on allergen-induced response in asthmatic subjects", European Respiratory Journal 1997; vol. 10, pp. 1008-1014.
Hiraishi, et al: "Clinical trial: irsogladine maleate, a mucosal protective drug, accelerates gastric ulcer healing after treatment for eradication of *Helicobacter pylori* infection—the results of a multicenter, double-blind, randomized clinical trial (Impact study)", Alimentary Pharmacology and Therapeutics; Feb. 2010; vol. 31(8), pp. 824-833; XP055648649.
Hirano, et al: "Endoscopic assessment of the oesophageal features of eosinophilic oesophagitis: validation of a novel classification and grading system", Gut 2013 (published online May 22, 2012); vol. 62(4), pp. 489-495.
Hirano, et al: "RPC4046, a Monoclonal Antibody Against IL13, Reduces Histologic and Endoscopic Activity in Patients With Eosinophilic Esophagitis", Gastroenterology 2019; vol. 156(3), pp. 592-603;e10.
Hiremath, et al: "Individuals affected by eosinophilic gastrointestinal disorders have complex unmet needs and frequently experience unique barriers to care", Clin Res Hepatol Gastroenterol.; Oct. 2018; vol. 42(5), pp. 483-493.
Hong, et al: "Genetics of Food Allergy", Curr Opin Pediatr.; Dec. 2009; vol. 21(6), pp. 770-776.
Jawairia, et al: "Eosinophilic gastrointestinal diseases: review and update", International Scholarly Research Network; ISRN Gastroenterology 2012; vol. 2012(463689), pp. 1-8.
Jensen, et al: "Prevalence of Eosinophilic Gastritis, Gastroenteritis, and Colitis: Estimates From a National Administrative Database", J Pediatr Gastroenterol Nutr.; Jan. 2016; vol. 62(1), pp. 36-42.
Kay, et al: "Allergy and Allergic Diseases, Second of Two Parts, Allergic Diseases and their Treatment", New England Journal of Medicine; Jan. 11, 2001; 344(2), pp. 30-37.
Kim, et al: "Rebound eosinophilia after treatment of hypereosinophilic syndrome and eosinophilic gastroenteritis with monoclonal anti-IL-5 antibody SCH55700", J Allergy Clin Immunol. 2004; vol. 114(6), pp. 1449-1455.
Kinoshita, et al: "Recent progress in the research of eosinophilic esophagitis and gastroenteritis", Digestion; Jan. 14, 2016; vol. 93; pp. 7-12.
Kottyan, et al: "Genome-wide association analysis of eosinophilic esophagitis provides insight into the tissue specificity of this allergic disease", Nat Genet.; Aug. 2014; vol. 46(8), pp. 895-900.

Kuramoto, et al: "Preventive effect of irsogladine or omeprazole on non-steroidal anti-inflammatory drug-induced esophagitis, peptic ulcers, and small intestinal lesions in humans, a prospective randomized controlled study", BMC Gastroenterology, Biomed Central Ltd.; May 14, 2013; vol. 13(1); p. 85; XP021150650.
Lee, et al: "More than just counting eosinophils: proximal oesophageal involvement and subepithelial sclerosis are major diagnostic criteria for eosinophilic oesophagitis", J Clin Pathol. 2010; vol. 63(7), pp. 644-647.
Lim, et al: "Epigenetic regulation of the IL-13-induced Human Eotaxin-3 Gene by CREB-binding protein-mediated Histone 3 Acetylation", The Journal of Biological Chemistry; Apr. 15, 2011 (pre-published on Feb. 16, 2011); vol. 286(15), pp. 13193-13204.
Lipowska, et al: Current Diagnostic and Treatment Strategies for Eosinophilic Esophagitis. Gastroenterology & Hepatology; Sep. 2017; vol. 13(9), pp. 527-535.
Lu, et al: "Randomized, placebo-controlled study of a selective PDE4 inhibitor in the treatment of asthma", Respir Med.; published online Jan. 8, 2009; vol. 103(3), pp. 342-347.
Lucendo, et al: "Montelukast was inefficient in maintaining steroid-induced remission in adult eosinophilic esophagitis", Dig Dis Sci.; Jun. 15, 2011; vol. 56(12), pp. 3551-3558.
Lucendo, et al: "Guidelines on eosinophilic esophagitis: evidence-based statements and recommendations for diagnosis and management in children and adults", United European Gastroenterology Journal 2017; vol. 5(3), pp. 335-358.
Lucendo, et al: "Budesonide orodispensable tablets are highly effective to maintain clinical-histological remission in adult patients with eosinophilic esophagitis: Results from 48 weeks, double blind, placebo-controlled, pivotal EOS-2 trial", Abstract 951; Gastroenterology 2019; vol. 156 (1); S:1509.
Mansoor, et al: "Prevalence of Eosinophilic Gastroenteritis and Colitis in a Population-Based Study, from 2012 to 2017", Clinical Gastroenterology and Hepatology 2017; vol. 15(11), pp. 1733-1741.
Mould, et al: "Relationship between IL-5 and Eotaxin in Regulating Blood Tissue Eosinophil in Mice", J Clin Invest; Mar. 1997; vol. 99(5), pp. 1067-1071.
Muir, et al: "Role of Endoscopy in Diagnosis and Management of Pediatric Eosinophilic Esophagitis", Gastrointest Endosc Clin N Am.; Jan. 2016; vol. 26(1), pp. 187-200.
Murali, et al: "Topical steroids in eosinophilic esophagitis: Systematic review and meta-analysis of placebo-controlled randomized clinical trials", Journal of Gastroenterology and Hepatology 2016; vol. 31(6), pp. 1111-1119.
Netzer, et al: "Corticosteroid-dependent eosinophilic oesophagitis: azathioprine and 6-mercaptopurine can induce and maintain long-term remission", European Journal of Gastroenterology & Hepatology 2007; vol. 19(10), pp. 865-869.
Nishimura, et al: "Genetics of allergic disease: evidence for organ-specific susceptibility genes", Int Arch Allergy Immunol. 2001; vol. 124(1-3), pp. 197-200.
Otani, et al: "Anti-IL-5 therapy reduces mast cell and IL-9 cell numbers in pediatric patients with eosinophilic esophagitis", J Allergy Clin Immunol.; Jun. 2013; vol. 131(6), pp. 1576-1582; e2.
Philpott, et al: "The role of maintenance therapy in eosinophilic esophagitis: who, why, and how?", J Gastroenterol. 2018; vol. 53(2), pp. 165-171.
Redondo-Cerezo, et al: "Eosinophilic Gastroenteritis; Our Recent Experience: One-year Experience of Atypical Onset of an Uncommon Disease", Scand J Gastroenterol 2001; vol. 36, pp. 1358-1360.
Reed, et al: "Food elimination diets are effective for long-term treatment of adults with eosinophilic oesophagitis", Aliment Pharmacol Ther.; Nov. 2017; vol. 46(9), pp. 836-844.
Rocha, et al: "Omalizumab in the treatment of eosinophilic esophagitis and food allergy", Eur J Pediatr.; Aug. 2, 2011; vol. 170(11), pp. 1471-1474.
Rothenberg, "Eotaxin, An Essential Mediator of Eosinophil Trafficking into Mucosa Tissues", American Journal of Respitory Cell Molecular Biology 1999; vol. 21, pp. 291-295.
Rothenberg, "Eosinophilic Gastrointestinal Disorders, EGID", Journal Allergy Clin Immunl; Jan. 2004; vol. 113, pp. 11-28.
Ruffner, et al: "Non-IgE-mediated food allergy syndromes", Ann Allergy Asthma Immunol.; Nov. 2016; vol. 117(5), pp. 452-454.

(56) References Cited

PUBLICATIONS

Silva, et al: "Eosinophils in the gastrointestinal tract: how much is normal?", Virchows Archiv.; Jul. 10, 2018; vol. 473(3), pp. 313-320.
Simon, et al: "Eosinophilic esophagitis is characterized by a non-IgE-mediated food hypersensitivity", Allergy/European Journal of Allergy and Clinical Immunology 2016; vol. 71(5), pp. 611-620.
Steinbach, et al: "Eosinophilic Esophagitis and the Eosinophilic Gastrointestinal Diseases: Approach to Diagnosis and Management", The Journal of Allergy and Clinical Immunology: An Official Journal of AAAAI, Ameican Academy of Allergy Asthma & Immunology; Sep. 2018; vol. 6(5), pp. 1483-1495; XP055648659.
Stone, et al: "Immunomodulatory therapy of eosinophil-associated gastrointestinal diseases", Clin Exp Allergy; Dec. 2008; vol. 38(12), pp. 1858-1865.
Straumann, et al: "Anti-TNF-alpha (infliximab) therapy for severe adult eosinophilic esophagitis", J Allergy Clin Immunol 2008; vol. 122(2), pp. 425-427.
Straumann, et al: "Long-term budesonide maintenance treatment is partially effective for patients with eosinophilic esophagitis", Clinical Gastroenterology and Hepatology; May 2011; vol. 9(5), pp. 400-409.
Suzuki, et al: "Irsogladine maleate and rabeprazole in non-erosive reflux disease: A double-blind, placebo-controlled study", World Journal of Gastroenterology; Apr. 28, 2015; vol. 21(16), pp. 5023-5031; XP055648653.
Van Rhijn, et al: "Rapidly increasing incidence of eosinophilic esophagitis in a large cohort", Neurogastroenterol Motil. 2013; vol. 25(1), pp. 47-52; e5.
Van Rhijn, et al: "Proton pump inhibitors partially restore mucosal integrity in patients with proton pump inhibitor-responsive esophageal eosinophilia but not eosinophilic esophagitis", Clinical Gastroenterology and Hepatology 2014; vol. 12(11), pp. 1815-1823; e2.
Walker, et al: "Eosinophilic gastroenteritis and other eosinophilic gut diseases distal to the oesophagus", The Lancet Gastroenterol Hepatol.; Apr. 2018; vol. 3(4), pp. 271-280.
Wang, et al: "Inhibition of Eosinophil Survival by a Selective Inhibitor of Phosphodiesterase 4 via the Induction of Apoptosis", Biological and Pharmaceutical Bulletin (of Japan); Mar. 2005; vol. 28(3), pp. 515-519; XP055648824.
Wechsler, et al: "Biological therapies for eosinophilic gastrointestinal diseases", J Allergy Clin Immunol.; Jul. 2018; vol. 142(1), pp. 24-31; e2.
Zuo, et al: "Gastrointestinal eosinophilia", Immunol Allergy Clin North Am.; Aug. 2007; vol. 27(3), pp. 443-455.

\* cited by examiner

IRSOGLADINE FOR THE TREATMENT OF EOSINOPHILIC GASTROINTESTINAL DISEASES

CROSS-REFERENCE

This application is a 35 USC 371 national phase filing of PCT/EP2020/065660 filed on Jun. 5, 2020, which claims the benefit of European Patent Application EP19382478.6 filed on Jun. 7, 2019, both applications are incorporated herein by reference in entirety.

TECHNICAL FIELD

The present invention belongs to the field of medicine, in particular of treatments for gastrointestinal diseases. The treatments of the invention are particularly useful for patients suffering from eosinophilic gastrointestinal diseases, including eosinophilic esophagitis.

BACKGROUND ART

Eosinophilic Gastrointestinal Diseases (EoGIDs) are a group of inflammatory gastrointestinal disorders resulting from an excessive infiltration and aberrant activity of eosinophils in one or several parts of the gastrointestinal tract in the absence of known causes for such tissue eosinophilia. This results in symptoms related to the organ involved (pain, dysphagia, diarrhea, intestinal obstructive symptoms, etc.). Remarkably, blood eosinophil counts are normal in the majority of patients with EoGIDs (Zuo L, Rothenberg M E. Gastrointestinal eosinophilia. *Immunol Allergy Clin North Am.* 2007; 27 (3):443-455). EoGIDs are chronic or relapsing diseases and do not have a specifically targeted therapy (Walker M M, Potter M, Talley N J. Eosinophilic gastroenteritis and other eosinophilic gut diseases distal to the oesophagus. *Lancet Gastroenterol Hepatol.* 2018; 3 (4):271-280).

Consequently, EoGIDs can strongly negatively affect the quality of life of the patient as a result of the recurrence of symptoms, the limitations related to available therapies, the emotional distress and restricted social activities. A recent study surveying patient advocacy groups of EoGID in United States concluded that although these patients have a constellation of complex unmet needs and perceived barriers across medical, healthcare, social and emotional domains, the medical domain was of highest priority among the patients (Hiremath G, Kodroff E, Strobel MJ, et al. Individuals affected by eosinophilic gastrointestinal disorders have complex unmet needs and frequently experience unique barriers to care. *Clin Res Hepatol Gastroenterol.* 2018; 42 (5):483-493).

EoGIDs comprise a group of diseases that are expressed at different parts of the digestive tract. From this group of diseases, eosinophilic esophagitis (EoE) is the best characterized, whereas for the other EoGIDs less data is available, probably due to their lower incidence and prevalence. In Eosinophilic Esophagitis, Eosinophilic Gastritis, Eosinophilic gastro-enteritis and Eosinophilic colitis, the prevalence in United States is of 57/100.000, 6.3/100.000, 5.1-8.4/100.000 and 2.1-3.3/100.000 respectively (Jensen E T, Martin C F, Kappelman M D, Dellon E S. Prevalence of Eosinophilic Gastritis, Gastroenteritis, and Colitis: Estimates From a National Administrative Database. *J Pediatr Gastroenterol Nutr.* 2016; 62 (1):36-42; Mansoor E, Saleh M A, Cooper G S. Prevalence of Eosinophilic Gastroenteritis and Colitis in a Population-Based Study, From 2012 to 2017. *Clin Gastroenterol Hepatol.* 2017; 15 (11):1733-1741). Other sub-categories of eosinophilic enteritis include eosinophilic duodenitis, eosinophilic jejunitis and eosinophilic ileitis, whose prevalence is not yet characterized, to our knowledge. In the last years, the incidence of this group of diseases is rapidly increasing, especially in the case of EoE, which involves both adults and children (van Rhijn B D, Verheij J, Smout A J, Bredenoord A J. Rapidly increasing incidence of eosinophilic esophagitis in a large cohort. *Neurogastroenterol Motil.* 2013; 25 (1):47-52.e5). Moreover, recurrence risk in EoE has been estimated 50-fold and the familial pattern is noted in about 10% of cases.

This group of diseases may be clinically present with either acute or slowly progressing symptoms and patients experience periodic flares-up of inflammation and, upon treatment, periods of remissions (Walker M M, Potter M, Talley N J. Eosinophilic gastroenteritis and other eosinophilic gut diseases distal to the oesophagus. *Lancet Gastroenterol Hepatol.* 2018; 3 (4):271-280). Further, after withdrawal of the treatment to induce disease remission, clinical symptoms reappear in about 85 per cent of cases between 5 and 12 weeks later. It has also been shown that the anatomical lesion in the organ involved recurs earlier than appearance of symptoms, since symptoms only mildly correlate with endoscopic and histological signs (Philpott H, Dellon E S. The role of maintenance therapy in eosinophilic esophagitis: who, why, and how?. *J Gastroenterol.* 2018; 53 (2):165-171; Lucendo AJ, et al. Budesonide orodispensable tablets are highly effective to maintain clinical-histological remission in adult patients with eosinophilic esophagitis: Results from 48 weeks, double blind, placebo-controlled, pivotal EOS-2 trial: Abstract 951. *Gastroenterology,* 2019; 156 (suppl 1): S:1509). None of the studies have found clinical, endoscopic and histological predictors of early relapse. This data emphasizes the need of a treatment for maintaining disease in remission.

It is thought that EoGIDs develop in response to a continued or persistent immunogenic trigger(s) and some foodstuffs have been blamed for it (Galli S J, Tsai M, Piliponsky A M. The development of allergic inflammation. *Nature.* 2008; 454 (7203):445-454). Some of these diseases respond to strict exclusion diets (Steinbach E C, Hernandez M, Dellon E S. Eosinophilic Esophagitis and the Eosinophilic Gastrointestinal Diseases: Approach to Diagnosis and Management. *JAllergy Clin Immunol Pract.* 2018; 6 (5): 1483-1495). However, avoidance of offending foods must be permanent to maintain patient in remission. Compliance of exclusion diet therapy is very difficult and in "real world" the rates of remission are much lower than those in clinical trials (Steinbach E C, Hernandez M, Dellon E S. Eosinophilic Esophagitis and the Eosinophilic Gastrointestinal Diseases: Approach to Diagnosis and Management. *J Allergy Clin Immunol Pract.* 2018; 6(5):1483-1495). In addition, many children on exclusion diet develop delayed oral motor skills required for feeding, since submission to this regime during the early formative years delays the natural development of these skills (Haas A M, Maune N C. Clinical presentation of feeding dysfunction in children with eosinophilic gastrointestinal disease. *Immunol Allergy Clin North Am.* 2009; 29 (1):65-75). Furthermore, compensatory behaviors such as careful chewing of food prolongs mealtimes and may limit caloric intake with further impact on nutritional status of the patients. The relapse frequency in children brings also consequences in their growth and development. Therefore, exclusion diets cannot be envisaged as a real chronic treatment, although they may be effective for inducing remission (short term). Also, it has been shown that exclusion diets in adults are effective in 40 per cent of cases and, for those responding to exclusion diets, less than 50 per cent are able to maintain this long-life treatment for more than two years (Reed C C, Fan C, Koutlas N T, Shaheen N J, Dellon E S. Food elimination diets are effective for long-term treatment of adults with eosinophilic oesophagitis. *Aliment Pharmacol Ther.* 2017; 46 (9):836-844).

EoE patients are also commonly treated with proton pump inhibitors (PPIs). However, only a subgroup of these patients responds to PPIs. This effect has been attributed to a mechanism independent to acid antisecretory capacity of PPIs (Dellon E S, Liacouras C A, Molina-Infante J, et al. Updated International Consensus Diagnostic Criteria for Eosinophilic Esophagitis: Proceedings of the AGREE Conference. *Gastroenterology.* 2018; 155 (4):1022-1033.e10). In fact, in EoE, PPI treatment only partially restores esophageal mucosa to normality (van Rhijn B D, Weijenborg P W, Verheij J, et al. Proton pump inhibitors partially restore mucosal integrity in patients with proton pump inhibitor-responsive esophageal eosinophilia but not eosinophilic esophagitis. *Clin Gastroenterol Hepatol.* 2014; 12 (11): 1815-23.e2).

In acute phases, treatment of EoGIDs consists on the administration of oral (topical or systemic) corticosteroids. In EoE, even swallowed topical low dose corticosteroids, although effective and well tolerated in the short term, rarely maintain remission after one year of treatment. Furthermore, even topical low-dose steroid treatment is not free of side effects, especially when prolonged or repetitive therapy is necessary because of frequent recurrences or if used as maintenance treatment. Using this therapy, candidiasis appears between 5 and 15 per cent of cases (children and adults) and mild to moderate adrenal suppression has been described, as well as growth retardation in infancy (Murali A R, Gupta A, Attar B M, Ravi V, Koduru P. Topical steroids in eosinophilic esophagitis: Systematic review and meta-analysis of placebo-controlled randomized clinical trials. *J Gastroenterol Hepatol.* 2016; 31 (6):1111-1119; Golekoh M C, Hornung L N, Mukkada V A, Khoury J C, Putnam P E, Backeljauw P F. Adrenal Insufficiency after Chronic Swallowed Glucocorticoid Therapy for Eosinophilic Esophagitis. *J Pediatr.* 2016; 170:240-245).

In addition, steroid-sparing agents have been used in EoE and Eosinophilic Gastroenteritis (EoGE) with variable therapeutic response. Azathioprine has shown efficacy in two reports including a small number of cases of EoE and EoGE, but the efficacy in large series of subjects has not been proven (Netzer P, Gschossmann J M, Straumann A, Sendensky A, Weimann R, Schoepfer A M. Corticosteroid-dependent eosinophilic oesophagitis: azathioprine and 6-mercaptopurine can induce and maintain long-term remission. *Eur J Gastroenterol Hepatol.* 2007; 19 (10):865-869). Notwithstanding, Azathioprine is not free of side effects.

Other treatments have been attempted both in EoE alone and EoGIDs. Montelukast, a cysteil leukotriene type 1 receptor blocker, has not shown efficacy in reducing tissue eosinophil infiltrate or clinical symptoms in patients with eosinophilic gastroenteritis. In addition, it has not proven therapeutic efficacy in maintaining disease remission in eosinophilic esophagitis (Lucendo A J, De Rezende L C, Jiménez-Contreras S, et al. Montelukast was inefficient in maintaining steroid-induced remission in adult eosinophilic esophagitis. *Dig Dis Sci.* 2011; 56 (12):3551-3558).

Targeting inflammatory molecules with monoclonal antibodies (mAb) has also been attempted for the treatment of EoE and EoGIDs. Anti-TNFα mAb (Infliximab and Adalumimab) have not shown efficacy neither in decreasing the eosinophil infiltrate nor improving clinical symptoms in these conditions (Jawairia M, Shahzad G, Mustacchia P. Eosinophilic gastrointestinal diseases: review and update. *ISRN Gastroenterol.* 2012; 2012:463689.)

Additionally, two different of mAb to block IL-5 have been developed: mAb against IL-5 (Mepolizumab and Resolizumab) and a mAb against IL-5 receptor (Benralizumab). Clinical trials have been done in EoE patients showing in both of them a significant reduction in the eosinophil infiltration of the esophageal mucosa, but this finding did not correspond with clinical improvement of the patients treated (Assa'ad A H, Gupta S K, Collins M H, et al. An antibody against IL-5 reduces numbers of esophageal intraepithelial eosinophils in children with eosinophilic esophagitis. *Gastroenterology.* 2011; 141 (5):1593-1604; Otani I M, Anilkumar A A, Newbury R O, et al. Anti-IL-5 therapy reduces mast cell and IL-9 cell numbers in pediatric patients with eosinophilic esophagitis. *J Allergy Clin Immunol.* 2013; 131 (6):1576-1582). Furthermore, although initially decreased the number of eosinophils in the gastrointestinal mucosa, a rebound of eosinophilia was observed in all responders together with clinical relapse (Kim Y J, Prussin C, Martin B, et al. Rebound eosinophilia after treatment of hypereosinophilic syndrome and eosinophilic gastroenteritis with monoclonal anti-IL-5 antibody SCH55700. *J Allergy Clin Immunol.* 2004; 114 (6):1449-1455).

Anti-IL-13 monoclonal antibody (QAX576) has shown to be effective in reducing tissue eosinophilia in adult patients with eosinophilic esophagitis; however, this finding was not accompanied by a clear improvement of symptoms. Moreover, a relevant side effect of this therapy was the development of upper respiratory infections (Hirano I, Collins M H, Assouline-Dayan Y, et al. RPC4046, a Monoclonal Antibody Against IL13, Reduces Histologic and Endoscopic Activity in Patients with Eosinophilic Esophagitis. *Gastroenterology.* 2019; 156(3):592-603.e10).

Omaluzimab, an anti-IgE, targets a highly affinity receptor binding site of human IgE; treatment resulted in a non-significant decrease in tissue eosinophils and variable effects on clinical symptoms (Foroughi S, Foster B, Kim N, et al. Anti-IgE treatment of eosinophil-associated gastrointestinal disorders. *J Allergy Clin Immunol.* 2007; 120 (3): 594-601; Rocha R, Vitor A B, Trindade E, et al. Omalizumab in the treatment of eosinophilic esophagitis and food allergy. *Eur. J Pediatr.* 2011; 170 (11):1471-1474). An additional randomized clinical trial in EoE showed no significant histological and clinical improvement (Clayton F, Fang J C, Gleich G J, et al. Eosinophilic esophagitis in adults is associated with IgG4 and not mediated by IgE. *Gastroenterology.* 2014; 147(3):602-609).

As can be seen, targeting a single signal involved in the pathogenesis of EoE or EoGIDs may not break the complex self-propagating inflammatory activation responsible for the perpetuation of the inflammatory response and the development of symptoms.

The behavior of EoGIDs is characteristic of chronic diseases with early relapse once the treatment is discontinued or even weaned. Recommendation for a maintenance therapy is based not only on prevention of disease relapse but also on preventing the future severe consequences such as esophageal or intestinal stenosis (Walker M M, Potter M, Talley N J. Eosinophilic gastroenteritis and other eosinophilic gut diseases distal to the oesophagus. *Lancet Gastroenterol Hepatol.* 2018; 3 (4):271-280).

Although EoGID were recognized as distinct clinical entities from the early 1990s (Collins M H, Capocelli K, Yang G Y. Eosinophilic Gastrointestinal Disorders Pathology. *Front Med (Lausanne)*. 2018; 4:261), they are currently classified as orphan diseases. Also, EoGIDs prevalence is low and long-term therapies either have difficult compliance (restriction diets) or carry side effects (corticosteroids). Besides, pathophysiological mechanisms are not fully understood and therefore treatments addressed to causative mechanisms (excessive eosinophilic infiltration) are not available. Thus, in spite of the efforts made so far, there is a long-felt need for effective treatments against EoGIDs that provide acute and long-term cures without significant side effects.

SUMMARY OF INVENTION

The present inventors have surprisingly found that Irsogladine is capable of reducing the eosinophilic infiltration to therapeutically relevant levels in patients suffering from eosinophilic gastrointestinal diseases (EoGIDs).

The immune system of the gastrointestinal tract presents an extraordinary complexity. On one hand, its mission is defending the organs from the invasion of unwanted environmental elements, as in the case of the respiratory tract, vagina, urinary bladder or skin. On the other hand, the gastro-intestinal tract has the physiological ability to incorporate to the internal milieu nutrients (highly complex molecules) without producing any damage to the gastro-intestinal tract and to other organs and, at the same time, to tolerate elements sharing or complementing physiological functions close to the mucosa (microbiota).

When inflammation occurs, while in the upper respiratory tract neutrophils and eosinophils are the predominant inflammatory cells, in the digestive system this is not always the case: eosinophils, although present, do not predominate (neutrophils, granulocytes, plasma cells are mostly found). Clinical data shows that the massive and aberrant eosinophil infiltration that supervenes in the gastrointestinal tract of EoGIDs patients is markedly different from the infiltration in patients suffering from asthma and eosinophilic dermatitis. In airways and skin inflammation, the infiltrates are not only due to eosinophils but also mostly and significantly to neutrophils and mast cells. Moreover, the genetic signature in chronic allergic inflammation in upper and lower airways diseases incompletely share those in EoGID (organ specificity). In addition, the type of antigens in the gastro-intestinal tract, airways and skin are different in type, magnitude of the load and persistent action (Nishimura A, Campbell-Meltzer R S, Chute K, Orrell J, Ono S J. Genetics of allergic disease: evidence for organ-specific susceptibility genes. *Int Arch Allergy Immunol.* 2001; 124 (1-3):197-200; Brandtzaeg P. Food allergy: separating the science from the mythology [published correction appears in Nat Rev Gastroenterol Hepatol. 2010 Sep.; 7 (9):478]. *Nat Rev Gastroenterol Hepatol.* 2010; 7 (7):380-400; Kottyan L C, Davis B P, Sherrill J D, et al. Genome-wide association analysis of eosinophilic esophagitis provides insight into the tissue specificity of this allergic disease. *Nat Genet.* 2014; 46 (8):895-900; Lim E J, Lu T X, Blanchard C, Rothenberg M E. Epigenetic regulation of the IL-13-induced human eotaxin-3 gene by CREB-binding protein-mediated histone 3 acetylation. *J Biol Chem.* 2011; 286(15):13193-13204).

Consequently, EoGIDs are considered a very special type of inflammatory diseases, not only due to the particularities of the organ where they take place, but also because of the characteristics of the immune infiltrate they produce (i.e. substantial increase in eosinophils, unlike the infiltrates in other gastrointestinal inflammatory diseases). Moreover, although EoGIDs are chronic antigen-driven inflammatory diseases, unlike asthma, rhinitis, atopic eczema and some food allergies, they are not mainly produced by primary IgE-mediated inflammatory reactions. (Simon D, Cianferoni A, Spergel J M, et al. Eosinophilic esophagitis is characterized by a non-IgE-mediated food hypersensitivity. *Allergy.* 2016; 71 (5):611-620; Ruffner M A, Spergel J M. Non-IgE-mediated food allergy syndromes. *Ann Allergy Asthma Immunol.* 2016; 117 (5):452-454). In fact, therapies specifically blocking IgE such as Omalizumab failed to control or induce remission in EoE (Clayton F, Fang J C, Gleich G J, et al. Eosinophilic esophagitis in adults is associated with IgG4 and not mediated by IgE. *Gastroenterology.* 2014; 147 (3):602-609). These findings inevitable led to conclude that mechanisms other than IgE are involved in EoGIDs (Atkins D. The Occasional Ebb and Flow between Eosinophilic Esophagitis and IgE-Mediated Food Allergy. *J Allergy Clin Immunol Pract.* 2018; 6 (2):651-652). All EoGIDs present some molecular characteristics in common, such as the involvement of the chemokines, IL-5, IL-13, and Eotaxin, among others. (Kinoshita Y, Ishimura N, Oshima N, et al. Recent Progress in the Research of Eosinophilic Esophagitis and Gastroenteritis. *Digestion.* 2016; 93 (1):7-12).

These similarities in the expression of up-regulated pro-inflammatory molecules can be explained by the fact that transcriptomic studies in eosinophilic gastritis show an increased expression of genes involved in potential operational pathways including T helper immunity driven by IL-4, IL-5. IL-13 and Eotaxin 3. (Walker M M, Potter M, Talley N J. Eosinophilic gastroenteritis and other eosinophilic gut diseases distal to the oesophagus. *Lancet Gastroenterol Hepatol.* 2018; 3 (4):271-280; Caldwell J M, Collins M H, Stucke E M, et al. Histologic eosinophilic gastritis is a systemic disorder associated with blood and extragastric eosinophilia, TH2 immunity, and a unique gastric transcriptome. *J Allergy Clin Immunol.* 2014; 134 (5):1114-1124). This transcriptome showed 90 per cent convergence with that of eosinophilic esophagitis, which suggests that treatments effective in EoE may be also effective in any EoGID. (Wechsler J B, Hirano I. Biological therapies for eosinophilic gastrointestinal diseases. *J Allergy Clin Immunol.* 2018; 142 (1):24-31.e2)

Not surprisingly, when treatments that work alleviating other allergic diseases have been applied to EoGID patients, they have only been effective in a reduced number of cases or have been unable to maintain disease remission and, in many cases, they have produced side effects (Lucendo A J, De Rezende L C, Jiménez-Contreras S, et al. Montelukast was inefficient in maintaining steroid-induced remission in adult eosinophilic esophagitis. *Dig Dis Sci.* 2011; 56 (12): 3551-3558; Rocha R, Vitor A B, Trindade E, et al. Omalizumab in the treatment of eosinophilic esophagitis and food allergy. *Eur J Pediatr.* 2011; 170 (11):1471-1474; Foroughi S, Foster B, Kim N, et al. Anti-IgE treatment of eosinophil-associated gastrointestinal disorders. *J Allergy Clin Immunol.* 2007; 120 (3):594-601). The only effective drug treatments have been the systemic or local corticosteroids and in a lesser extend some immuno-modulators (Stone K D, Prussin C. Immunomodulatory therapy of eosinophil-associated gastrointestinal diseases. *Clin Exp Allergy.* 2008; 38 (12):1858-1865; Netzer P, Gschossmann J M, Straumann A, Sendensky A, Weimann R, Schoepfer A M. Corticosteroid-dependent eosinophilic oesophagitis: azathioprine and 6-mercaptopurine can induce and maintain long-term remission. *Eur J Gastroenterol Hepatol.* 2007; 19 (10):865-869). As mentioned, the repeated or maintained treatment of these drugs are not free of undesired side-effects.

The present inventors have surprisingly found that the administration of Irsogladine efficiently reduces the amount of eosinophilic infiltration in patients with EoGIDs to therapeutically relevant levels (see Examples 1,2 and 3 below).

Irsogladine has been known as anti-gastric peptic ulcer drug without suppressing gastric acid secretion. The novel effect in this invention was unexpected because it has never been shown or suggested to have the capacity to inhibit eosinophilic gastro-intestinal infiltration. In fact, Irsogladine is a Protein Kinase A (PKA) inhibitor that indirectly inhibits the activity of Phosphodiesterase 4 (PDE4). When other PDE4 inhibitors have been tested for the treatment of eosinophilic diseases affecting other tissues (such as in bronchi in asthma), not only their therapeutic effects have been weak (Harbinson P L, MacLeod D, Hawksworth R, et al. The effect of a novel orally active selective PDE4 isoenzyme inhibitor (CDP840) on allergen-induced responses in asthmatic subjects. *Eur Respir J.* 1997; 10 (5):1008-1014), but also they have produced headache and other gastro-intestinal side effects such as nausea, vomiting and diarrhea of various degrees of severity. For these reasons, PDE4 inhibitors are not used to treat EoGIDs.

The inventors have found that when Irsogladine or a pharmaceutically acceptable salt thereof is administered to EoGID patients it impinges directly into the cause of these diseases by reducing the number of eosinophils infiltrating the gastrointestinal tract. This was highly unexpected due to the severity of and organ specificity of eosinophilic infiltration in EoGIDs (contrary to what would be expected according to the prior art teachings).

Thus, in a first aspect, the invention provides Irsogladine or a pharmaceutically acceptable salt thereof for use in the treatment and/or prevention of an eosinophilic gastrointestinal diseases in mammals.

This aspect can also be formulated as the use of Irsogladine or a pharmaceutically acceptable salt thereof for the manufacture of a medicament for the treatment and/or prevention of an eosinophilic gastrointestinal disease. This aspect can also be formulated as a method for treating and/or preventing an eosinophilic gastrointestinal disease, the method comprising administering a therapeutically effective amount of Irsogladine or a pharmaceutical salt thereof to a subject in need thereof.

DETAILED DESCRIPTION OF THE INVENTION

Figure 1:
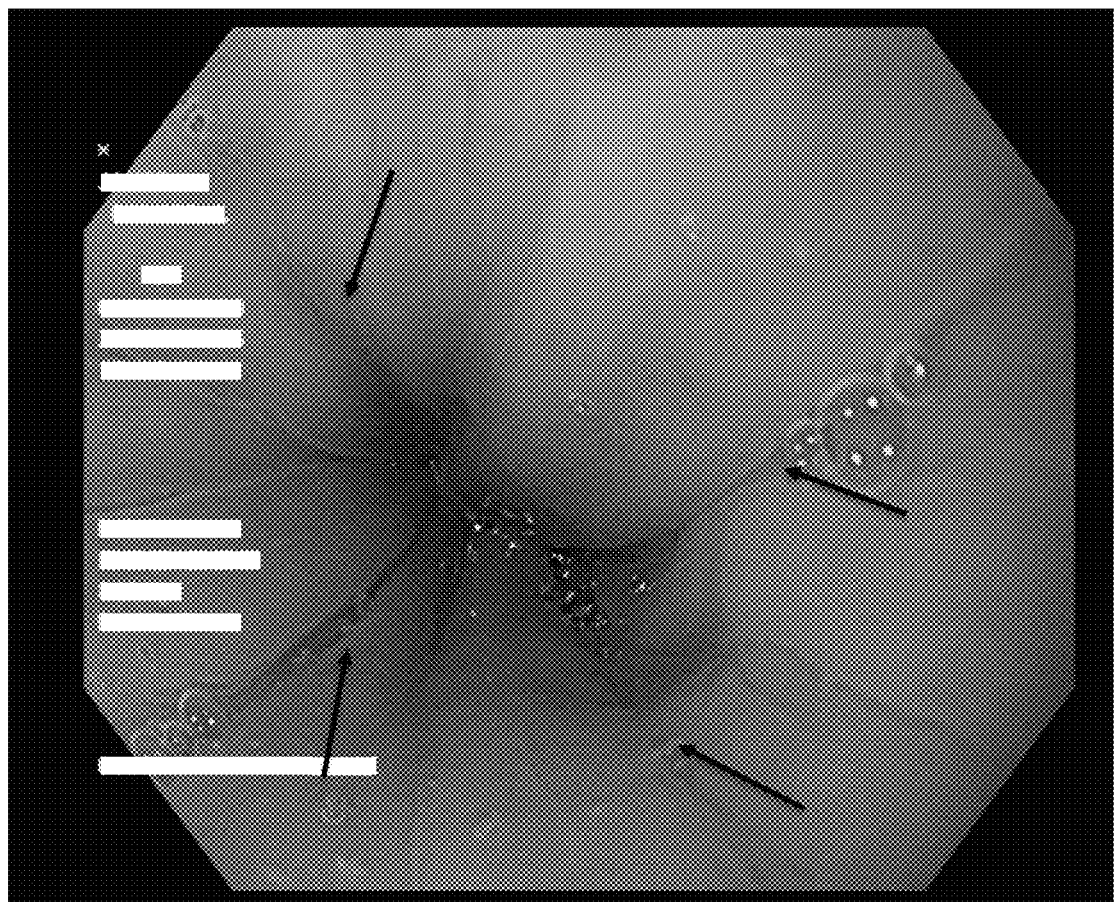
FIG. 1, related to Example 1, shows the initial esophageal endoscopy (prior to treatment with Irsogladine Maleate) of JJC. Edema and linear furrowing (black arrows) of esophageal mucosa are present, which are characteristic features found in active Eosinophilic Esophagitis.

All terms as used herein in this application, unless otherwise stated, shall be understood in their ordinary meaning as known in the art. Other more specific definitions for certain terms as used in the present application are as set forth below and are intended to apply uniformly through-out the specification and claims unless an otherwise expressly set out definition provides a broader definition.

The term "eosinophilic gastrointestinal disease" or "EoGID" refers to diseases caused by the local, excessive, infiltration and aberrant activity of eosinophils in the mucosa or deeper layer tissues of the gastrointestinal tract without evidence of being caused by parasites, infections, hypereosinophilic syndrome, drugs and/or cancer—i.e. primary disease. According to the tissue where the eosinophils accumulate, EoGIDs are classified as eosinophilic esophagitis (EoE), eosinophilic gastritis (EG), eosinophilic gastroenteritis (EGE), eosinophilic enteritis (EE) (also including eosinophilic duodenitis, eosinophilic jejunitis, eosinophilic ileitis), and eosinophilic colitis (EC). Among the EoGIDs, EoE is the most prevalent disease. Intriguingly, the esophagus is the only tissue of the gastrointestinal tract that does not contain eosinophils under normal conditions. Both the FDA and the EMA classify EoE as an orphan disease. In severe cases, it may be necessary to enlarge the esophageal diameter of patients through esophageal dilation.

As used herein, the term "pharmaceutically acceptable salt" refers to those salts which are, within the scope of sound medical judgment, suitable for use in contact with the tissues of humans and lower animals without undue toxicity, irritation, allergic response and the like, and are commensurate with a reasonable benefit/risk ratio. Pharmaceutical acceptable salts are well known in the art. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, trifluoroacetic acid, oxalic acid, maleic acid, tartaric acid, citric acid, succinic acid or malonic acid or by using other methods used in the art such as ion exchange. Other pharmaceutical acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, and ammonium. Representative alkali or alkaline earth metal salts include sodium, lithium, potassium, calcium, magnesium, and the like. Further pharmaceutical acceptable salts include, when appropriate, nontoxic ammonium, quaternary ammonium, and amine cations formed using counterions such as halide, hydroxide, carboxylate, sulfate, phosphate, nitrate, lower alkyl sulfonate and aryl sulfonate. The skilled person is able to prepare Irsogladine's pharmaceutically acceptable salts following routine methods.

The expression "therapeutically effective amount", as used herein, refers to the amount of Irsogladine or pharmaceutically acceptable salt thereof that, when administered, is sufficient to prevent development of, or alleviate to some extent, the histological severity (including, but not limited to, a significant decrease of mucosa eosinophilic infiltration) and/or one or more of the symptoms of the disease which is addressed (also expressed herein as "therapeutically relevant effect" or "therapeutical relevant levels"). The specific dose of the compounds of the invention to obtain a therapeutic benefit (or therapeutic relevant effect) may vary depending on the particular circumstances of the individual patient including, among others, the size, weight, age and sex of the patient, the nature and stage of the disease, the aggressiveness of the disease, and the route of administration. For example, a dose of from about 0.001 to about 300 mg/kg of body per day may be used. More particularly, a dose from 0.005 to 20 mg/kg of body per day is used. Even more particular, a dose of 0.005 to 3.0 mg/kg of body per day is used.

The expression "pharmaceutically acceptable excipients and/or carriers" refers to pharmaceutically acceptable materials, compositions or vehicles. Each component must be pharmaceutically acceptable in the sense of being compatible with the other ingredients of the pharmaceutical composition. It must also be suitable for use in contact with the tissue or organ of humans and non-human animals without excessive toxicity, irritation, allergic response, immunogenicity or other problems or complications commensurate with a reasonable benefit/risk ratio. Examples of suitable pharmaceutically acceptable excipients are solvents, dispersion media, diluents, or other liquid vehicles, dispersion or suspension aids, surface active agents, isotonic agents, thickening or emulsifying agents, preservatives, solid binders, lubricants and the like. Except insofar as any conventional excipient medium is incompatible with a substance or its derivatives, such as by producing any undesirable biological effect or otherwise interacting in a deleterious manner with any other component(s) of the pharmaceutical composition, its use is contemplated to be within the scope of this invention.

The term "concomitant" or "concomitantly" includes administering an agent in the presence of a second agent. A concomitant therapeutic treatment method includes methods in which the first, second, third or additional agents are co-administered. A concomitant therapeutic treatment method also includes methods in which the first or additional agents are administered in the presence of a second or additional agents, wherein the second or additional agents, for example, may have been previously administered. A concomitant therapeutic treatment method may be executed stepwise by the same or different actors. For example, one actor may administer to a subject a first agent and a second actor may administer a second agent, and the administering steps may be executed at the same time, or nearly at the same time, or at distant times, so long as the first agent (and additional agents) are after administration in the presence of the second agent (and additional agents). The actor and subject may be the same entity (e.g. human).

As mentioned above, the present invention provides Irsogladine or a pharmaceutically acceptable salt thereof for use in the treatment and/or prevention of an eosinophilic gastrointestinal disease.

Irsogladine is the International Nonproprietary Name (INN) of 6-(2,5-Dichlorophenyl)-1,3,5-triazine-2,4-diamine, and has the CAS number 57381-26-7. Irsogladine has the formula (I):

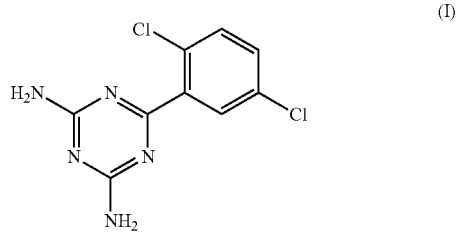 [SMILES: Nc1nc(N)nc(-c2cc(Cl)ccc2Cl)n1]

In a particular embodiment of the first aspect, optionally in combination with any of the embodiments above or below, the pharmaceutically acceptable salt is Irsogladine maleate.

In a particular embodiment of the first aspect, optionally in combination with any of the embodiments above or below, the Irsogladine or the pharmaceutically acceptable salt thereof is for use in the treatment and/or prevention of relapse of an eosinophilic gastrointestinal disease. Indeed, the inventors have found that Irsogladine or a pharmaceutically acceptable salt thereof is also useful for treating or preventing reappearance after first or any subsequent disease onsets, as induction and maintenance therapy (see definition below).

The invention also provides Irsogladine or a pharmaceutically acceptable salt thereof for use in combination therapy for the treatment or prevention of an eosinophilic gastrointestinal disease in a patient wherein Irsogladine or a pharmaceutically acceptable salt thereof is administered concomitantly, with one or more of an additional therapeutic agent selected from the group consisting of Mesalazine, Azathioprine, Mercaptopurine, Beclomethasone dipropionate, Budesonide, Fluticasone, Ciclesonide or systemic glucocorticoids, Anti-histaminics, Rebamipide, omeprazole, lansoprazole, esomeprazole, rabeprazole, ranitidine, famotidine, Misoprostol, Anti-leukotriene receptor blocker (e.g. Montelukast), Anti-TNF monoclonal antibodies (mAb) (e.g. Infliximab, Adalumimab), Interleukin 5 (IL-5) mAb (e.g. Mepolizumab, Resolizumab), IL-5 Receptor blocker (IL-5 R) (e.g. Benralizumab), IL-13 mAb (e.g. QAX576), IL-4 RA (e.g. Dupilumab), Anti-Immuno-globuline E (Anti-IgE) (e.g. Omalizumab) and combinations thereof.

In a more particular embodiment, optionally in combination with any of the embodiments above or below, wherein Irsogladine or a pharmaceutically acceptable salt thereof is administered concomitantly, with one or more of an additional therapeutic agent selected from the group consisting of Mesalazine, Azathioprine, Mercaptopurine, Beclomethasone dipropionate, Budesonide, Fluticasone, Ciclesonide, prednisone, prednisolone, methyl prednisolone, dexamethasone, ebastine, bilastine, Rebamipide, omeprazole, lansoprazole, esomeprazole, rabeprazole, pantoprazole, ranitidine, famotidine, Misoprostol, Montelukast, Infliximab, Adalumimab, Mepolizumab, Resolizumab, Benralizumab, QAX576, Dupilumab, Omalizumab, and combinations thereof.

Therefore, the invention also provides Irsogladine or a pharmaceutically acceptable salt thereof for use in combination therapy for the treatment or prevention of an eosinophilic gastrointestinal disease in a patient wherein Irsogladine or a pharmaceutically acceptable salt thereof is to be administered concomitantly with one or more than one gastroprotective drug, anti-inflammatory drug or substrate and/or gastro-intestinal tract function influencer drug or substrate. In a particular embodiment the Irsogladine or a pharmaceutically acceptable salt thereof is administered simultaneously with administration of one or more than one gastroprotective drug, an anti-inflammatory drug or substrate, monoclonal antibodies drug or substrate, leukotriene inhibitor drug or substrate, anti-IgE drug or substrate, and/or a gastro-intestinal tract function influencer drug or substrate. In another particular embodiment, the Irsogladine or a pharmaceutically acceptable salt thereof and one or more than one gastroprotective drug, the anti-inflammatory drug, monoclonal antibodies drug, leukotriene inhibitor drug, anti-IgE drug or substrate and/or the gastro-intestinal tract function influencer drug or substrate are administered separately, in any order, within a therapeutically effective interval.

A non-limiting but more exhaustive list of additional therapeutic agents reads as follows. Gastroprotective drugs (termed as "gastroprotective drug") that can be used concomitantly, (i.e. in combination, simultaneously or separately, with any other) within a therapeutically effective interval with Irsogladine or a pharmaceutically acceptable salt thereof is the following: proton-pump inhibitors (PPIs) (e.g. omeprazole, lansoprazole, esomeprazole, rabeprazole, pantoprazole), H$_2$ blockers (e.g. ranitidine, famotidine), Misoprostol, Rebamipide. Also, in another non-limiting list of anti-inflammatory drugs or substrates (termed as "anti-inflammatory drugs or substrates"), Irsogladine or a pharmaceutically acceptable salt thereof can be used concomitantly (i.e. in combination, simultaneously or separately, with any order) within a therapeutically effective interval with Mesalazine, Azathioprine, Mercaptopurine, Methotrexate, Systemic glucocorticoids (e.g. prednisolone, dexomethasone), Budesonide, Fluticasone, Beclometasone Dipropionate, Ciclesonide, Nonselective NSAIDs and COX inhibitors (for example, Ibuprofen, Ketoprofen, Naproxen, Diclofenac, Aceclofenac, Nabumetone, Indometacine, Lornoxicam, Meloxicam, Tenoxicam, Piroxicam, Insinoxine, Flurbiprofen, Fenilbutazone, Etoricoxibx and Colecoxib), Aspirin, oleanolic acid, ursolic acid, palmitoleic acid, glutamine, squalene, butyrate, acetate, proprionate, eicosapentaenoic acid (EPA), docosahexaenoic acid (DHA), Lipoteicoic Acid (LTA), quercetine, Vitamin D-3, curcumin, melatonin and Hyaluronic acid (including high and low molecular weight hyaluronic acid). Moreover, in another non-limiting list of gastro-intestinal tract function influencer drugs or substrates (termed as "gastro-intestinal tract function influencer drug or substrate"), Irsogladine or a pharmaceutically acceptable salt thereof can be used concomitantly (i.e. in combination, simultaneously or separately, with any order) within a therapeutically effective interval with Olmersartan, Valsartan, Ibersartan, Telmisartan, Losartan, Eprosartan, Candasartan, Amilodipine, Hydrochlortiazine, Recerocodrilo (Tiorfan), Loperamide, Clindamycin, Metronidazol, Rifaximine, anti-histaminics (such as ebastine and bilastine) and nitroglycerine.

Also, in another non-limiting list of additional drugs or substrates (termed as "monoclonal antibodies drugs or substrates"), Irsogladine or a pharmaceutically acceptable salt thereof can be used concomitantly (i.e. in combination, simultaneously or separately, with any order) within a therapeutically effective interval with Anti-TNF monoclonal antibodies (mAb) including but not limited to Infliximab and Adalumimab, Interleukin 5 (IL-5) mAb including but not limited to Mepolizumab and Resolizumab, IL-5 Receptor blocker (IL-5 R) including but not limited to Benralizumab, IL-13 mAb including but not limited to QAX576, IL-4 Receptor Antagonist including but not limited to Dupilumab.

Also, in another non-limiting list of additional drugs or substrates (termed as "anti-leukotriene drugs or substrates"), Irsogladine or a pharmaceutically acceptable salt thereof can be used concomitantly (i.e. in combination, simultaneously or separately, with any order) within a therapeutically effective interval with anti-leukotriene receptor blocker including but not limited to Montelukast.

Also, in another non-limiting list of additional drugs or substrates (termed as "anti-immunoglobuline E drugs or substrates"), Irsogladine or a pharmaceutically acceptable salt thereof can be used concomitantly (i.e. in combination, simultaneously or separately, with any order) within a therapeutically effective interval with Anti-Immuno-globuline E (Anti-IgE) including but not limited to Omalizumab.

In a particular embodiment, optionally in combination with any of the embodiments above or below, the mammal is a human.

In a particular embodiment, optionally in combination with any of the embodiments above or below, the eosinophilic gastrointestinal disease is selected from the group consisting of eosinophilic esophagitis, eosinophilic gastritis, eosinophilic gastroenteritis, eosinophilic enteritis (including eosinophilic duodenitis, eosinophilic jejunitis, eosinophilic ileitis) and eosinophilic colitis. In a more particular embodiment, the eosinophilic gastrointestinal disease is eosinophilic esophagitis.

As explained above, among the EoGIDs, EoE is the most prevalent disease. Intriguingly, the esophagus is the only tissue of the gastrointestinal tract that does not contain eosinophils under normal conditions. Both the FDA and the EMA classify EoGIDs and, in particular, EoE as orphan diseases. In severe cases, it is may be necessary to enlarge the esophageal diameter of patients through esophageal dilation.

In another particular embodiment, Irsogladine or a pharmaceutically acceptable salt thereof for use as above indicated is an adjuvant treatment (i.e co-therapy) in the eosinophilic gastrointestinal disease.

In yet another particular embodiment, optionally in combination with any of the embodiments provided above or below, Irsogladine or a pharmaceutically acceptable salt thereof for use as above indicated, wherein the daily dose is of 0.005-3.0 mg per kg of mammal body is used and wherein such daily dose is provided in a single day and/or in consecutive days and/or in a series of intermittent days. In a more particular embodiment, the daily dose is provided for a period of time selected from one month, six months, twelve months, and chronically (i.e. during the whole life of the subject or patient).

In yet another particular embodiment, optionally in combination with any of the embodiments provided above and below, Irsogladine or a pharmaceutical acceptable salt thereof is for use in the induction and/or maintenance of remission therapy. In a more particular embodiment, Irsogladine or a pharmaceutical acceptable salt thereof is for use in the induction and/or maintenance of remission therapy of eosinophilic gastrointestinal diseases in mammals.

As used herein, "induction of remission therapy" refers to the administration of Irsogladine or a pharmaceutical acceptable salt thereof to a patient or subject with active symptoms and/or histological lesions sufficient to prevent the development of, or alleviate to some extent, the histological severity (including, but not limited to, a significant decrease of mucosa eosinophilic infiltration) and/or one or more of the symptoms of the disease which is addressed (also expressed herein as "therapeutically relevant effect" or "therapeutic relevant levels").

As used herein, "maintenance of remission therapy" refers to the administration of a therapeutic relevant amount of Irsogladine or pharmaceutical acceptable salt thereof in a single day and/or in consecutive days and/or in a series of intermittent days to a subject or patient without symptoms and histological lesions to prevent the relapse of symptoms and/or histological lesions of EoGID.

In a particular embodiment, optionally in combination with any of the embodiments above or below, the Irsogladine or the pharmaceutically acceptable salt thereof is administered in the form of a pharmaceutical composition together with one or more pharmaceutically acceptable excipients and/or carriers.

In a particular embodiment, such excipient and/or carrier is hyaluronic acid and derivatives thereof.

Particular doses and posology indicated for Irsogladine or a pharmaceutically acceptable salt thereof do also apply to this drug when in form of a pharmaceutical composition.

In a particular embodiment, optionally in combination with any of the embodiments above or below, the pharmaceutical composition is in a form selected from the group consisting of an oral pharmaceutical composition, a nasal pharmaceutical composition, a rectal pharmaceutical composition, an intra-muscular pharmaceutical composition, an intravenous pharmaceutical composition, and combinations thereof.

In a more particular embodiment, optionally in combination with any of the embodiments above or below, the pharmaceutical composition is administered in the form of an oral pharmaceutical composition (for buccal cavity) selected from the group consisting of an oro-dispersable, tablets, powders, fine granules, granules, capsules (e.g. hard or soft gelatin capsules), troches (pastilles), mouth wash, mouth spray and/or chewing gums, gels or viscous solutions pharmaceutical compositions and combinations thereof.

In another particular embodiment, optionally in combination with any of the embodiments above or below, the Irsogladine or a pharmaceutically acceptable salt thereof for use as above indicated, is administered in the form of a naso-buccal pharmaceutical composition selected from the group consisting of a spray, an inhalator pharmaceutical compositions and combinations thereof.

The pharmaceutical composition provided by the present invention may be administered by different routes of administration. Particular routes include but are not limited to oral, sublingual, nasal (i.e. nasal or naso-buccal), aerosol, inhaled, transdermal, transmucosal, intradermal, subcutaneous, intramuscular, intraperitoneal, intravenous, intratechal or rectal route. In one embodiment, the pharmaceutical composition is administered in the form of an oral pharmaceutical composition.

The composition may be prepared using state of the art excipients and applying usual pharmaceutical technologies including particularities for the preparation of formulations comprising more than one active principle.

The dosage form may be a solid pharmaceutical composition such as tablets or coated tablets, powders, fine granules, granules, capsules e.g. hard or soft gelatin capsules, troches (pastilles), a bolus and chewable preparations, orally dispensable, quick or slow release, containing Irsogladine or pharmaceutically acceptable salt thereof.

Alternatively, the pharmaceutical composition may be a semisolid (viscous solutions) or liquid dosage form such as gel, e.g. a hydrogel, a cream, an ointment, a lotion, water-in-oil or oil-in-water emulsions, suspensions, aerosols, foams and liquid preparations such as solutions, elixirs, syrups including dry syrups.

The preparation of pharmaceutical forms of the abovementioned kind is well-known per se from the prior art. The dose of Irsogladine or a pharmaceutically acceptable salt thereof containing composition of the invention to be administered may appropriately be controlled depending on the dosage forms of the desired pharmaceutical preparations.

The pharmaceutical composition of the invention may be administered to a patient in a daily dose in portions over one or several times per day if it is in the dosage form of an orally administered solid preparation such as a tablet or an orally or nasally administered liquid preparation. Also, a liquid, gel, viscous, foamy or suppository preparations can be administered via rectum.

The amount of the effective substance may also be formulated into a single dose, in as much as it is not unreasonable from the viewpoint of the dosage form of the pharmaceutical preparation.

In one embodiment, the solid dosage form such as a capsule, tablet, pastille, granule, a powder or a liquid or another dosage form for oral application may contain Irsogladine or a pharmaceutically acceptable salt thereof in an amount allowing to provide 0.05 to 200 mg of the active ingredient per single dose. More in particular, in an amount allowing to provide 0.1 to 150 mg, 0.1 to 100 mg, 0.1 to 80 mg, or 0.1 to 60 mg of the active ingredient per single dose.

In the preparation of the Irsogladine or a pharmaceutically acceptable salt thereof containing composition, a variety of currently used additives may be employed, such as one or more of a filler, a thickening agent, a gelling agent, a binder, a disintegrator, a surfactant, a lubricant, a coating agent, a sustained release agent, a diluent and/or one or more excipients. In addition to the foregoing, the agent of the present invention may, if necessary, further comprise other additives such as a solubilizing agent, a buffering agent, a preservative, an isotonic agent, an emulsifying agent, a suspending agent, a dispersant, a hardening agent, an absorbent, an adhesive, an elasticizing agent, an adsorbent, a perfume, a coloring agent, a corrigent, an antioxidant, a humectant, a light-screening agent, a brightener, a viscosity enhancer, an oil, a tableting adjuvant, and/or an anti-static agent.

More specifically, examples of such additives include one or more excipients such as hyaluronic acid, lactose, corn starch, mannitol, D-sorbitol, crystalline cellulose, erythritol and sucrose; a binder such as hydroxypropyl cellulose (HPC-L), hydroxypropyl methyl cellulose, polyvinyl pyrrolidone, methyl cellulose and gelatinized starch; a disintegrator such as calcium carboxymethyl cellulose, crosslinked sodium carboxymethyl cellulose and crosslinked polyvinyl pyrrolidone (crospovidon); a lubricant such as magnesium stearate and talc; a perfume, for instance, a flavor or an aromatic oil such as apple essence, honey flavour, 1-menthol, vanillin, lemon oil, cinnamon oil, mentha oil or peppermint oil, Lipoteicoic acid; and/or an adsorbent such as synthetic aluminum silicate and light anhydrous silicic acid.

Moreover, it is also possible to prepare coated pharmaceutical preparations through the use of a currently used coating agent such as, for example, hydroxypropyl methyl cellulose, hydroxypropyl cellulose, methyl cellulose or polyvinyl pyrrolidone.

If necessary, a sweetener may likewise be used, such as in troches, syrups and chewable preparations among others. Specific examples of such sweeteners are mannitol, glucose, maltose, starch syrup, malt extract, maltitol, sorbitol, sucrose, unrefined sugar, fructose, lactose, honey, xylitol, hydrangea tea, saccharin, aspartame, cyclamate, Sunett®, aspartyl phenylalanine ester and other malto-oligo saccharides, and oligo saccharides such as maltosyl sucrose, isomaltyrose of reduced type and raffinose, Acesulfame potassium or any kind of sugar alcohols or mixtures thereof such as sorbitol, mannitol and/or xylitol.

As solubilisers any known solubiliser suitable in the medical sector may be used, for example polyethyleneglycols, polyoxyethylene-polyoxypropylene copolymers (e.g. poloxamer 188), glycofurol, arginine, lysine, castor oil, propyleneglycol, solketal, polysorbate, glycerol, polyvinyl pyrrolidone, lecithin, cholesterol, 12-hydroxystearic acid-PEG660-ester, propyleneglycol monostearate, polyoxy-40-hydrogenated castor oil, polyoxyl-10-oleyl-ether, polyoxyl-20-ceto-stearylether and polyoxyl-40-stearate or a mixture thereof.

Any preservatives known for use in the pharmaceutical field may be used, for example, ethanol, benzoic acid and the sodium or potassium salts thereof, sorbic acid and the sodium or potassium salts thereof, chlorobutanol, benzyl alcohol, phenylethanol, methyl-, ethyl-, propyl- or butyl-p-hydroxybenzoates, phenol, m-cresol, p-chloro-m-cresol, those selected from the group of the PHB esters, e.g. mixtures of PHB-methyl with PHB-propylesters, quaternary ammonium compounds such as benzalkonium chloride, thiomersal, phenyl-mercury salts such as nitrates, borates.

The buffer system used to achieve a desired pH value may be, for example, glycine, a mixture of glycine and HCl, a mixture of glycine and sodium hydroxide solution, and the sodium and potassium salts thereof, a mixture of potassium hydrogen phthalate and hydrochloric acid, a mixture of potassium hydrogen phthalate and sodium hydroxide solution or a mixture of glutamic acid and glutamate.

Suitable gelling agents are for example cellulose and its derivatives, like for instance methyl cellulose, carboxymethyl cellulose, hydroxypropylmethyl cellulose, poly(vinyl) alcohol, polyvinylpyrrolidones, polyacrylates, poloxamers, tragacanth, carrageenan, starch and its derivatives or any other gelling agent used in pharmaceutical technology.

Viscosity enhancers which may be mentioned are for example the aforementioned gelling agents in low quantities, glycerol, propylene glycol, polyethylene glycol or polyols, like sorbitol and other sugar alcohols.

The emulsifiers used, apart from the emulsifiers known from the prior art, may include polyoxyethylene derivatives of castor oil or polyoxyethylene alkylethers.

Suitable synthetic or natural, coloring agents known in the pharmaceutical field may be used such as Indigo carmine.

Suitable oily components which may be present are any of the oily substance known from the prior art for the preparation of pharmaceuticals, such as, for example, vegetable oils, in particular, e.g. cotton seed oil, groundnut oil, peanut oil, maize oil, rapeseed oil, sesame oil, olive oil and soya oil, or triglycerides of moderate chain length, e.g. fractionated coconut oil, or isopropylmyristate, -palmitate or mineral oils or ethyloleate.

The antioxidants used may be any of the antioxidants known from the prior art, for exemple a-tocopherol, butyl-hydroxytoluene (BHT) or butylhydroxyanisole (BHA).

Pharmaceutical compositions containing these additives may be prepared according to any method known in this field, depending on the dosage form. It is a matter of course that further additives not explicitly discussed may be used in the formulations used according to the present invention.

The invention also provides Irsogladine or a pharmaceutically acceptable salt thereof for use as adjuvant treatment in gastrointestinal diseases. Indeed, Irsogladine or a pharmaceutically acceptable salt thereof can also be used to complement treatments for gastrointestinal diseases different from EoGIDs, that also present eosinophilic infiltration. All embodiments of the first aspect of the invention are also meant to apply to the Irsogladine or a pharmaceutically acceptable salt thereof for use as adjuvant treatment in gastrointestinal diseases (i.e. doses, administration routes, etc.).

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim and shall not be construed as limiting the scope of the claim. Furthermore, the present invention covers all possible combinations of particular and preferred embodiments described herein.

EXAMPLES

Example 1

Example 1 solely refers to the diagnostic and treatment of a 39 years old human male named as JJC diagnosed with Eosinophilic Esophagitis (EoE) as a result of the following observations. JJC had history of 2-3 years of abdominal pain, difficulty to swallow food, transient episodes of esophageal obstruction, nausea, vomiting and weight loss. He had been unsuccessfully treated several times with Proton Pump Inhibitors (Omeprazole). A esophageal pH-metric study, performed without PPI treatment, was informed as normal. Because of suspicion of "food intolerance", JCC had been treated tentatively with restrictive diet (elimination of milk products, selfish, egg protein and nuts), which he was incapable to follow. Without other type of examination, JCC was empirically treated in three occasions with Budesonide. Despite this therapy was effective to improve symptoms, relapse was the rule and symptoms tended to reappear soon after 2 weeks of discontinuing both restricted diet and Budesonide treatments.

When seen, JCC was symptomatic, with difficulties to swallow food. Because of the symptoms and clinical history, Eosinophilic Esophagitis was suspected (Lucendo A J, et al. supra; Dellon E S, et al. supra; Lipowska A M, Kavitt R T. Current Diagnostic and Treatment Strategies for Eosinophilic Esophagitis. *Gastroenterol Hepatol* (N Y) 2017; 13(9):527-535). The patient had a normal bowel habit. He had neither blood nor urine biological tests abnormalities. Peripheral blood eosinophil count was normal (128 cells $mm^3$) and no fecal parasites were observed in three separate day examinations. An Enteral Magnetic Resonance Imaging was informed as normal, without inflammatory features, increased wall thickness or strictures in the gastro-intestinal tract.

Figure 2:
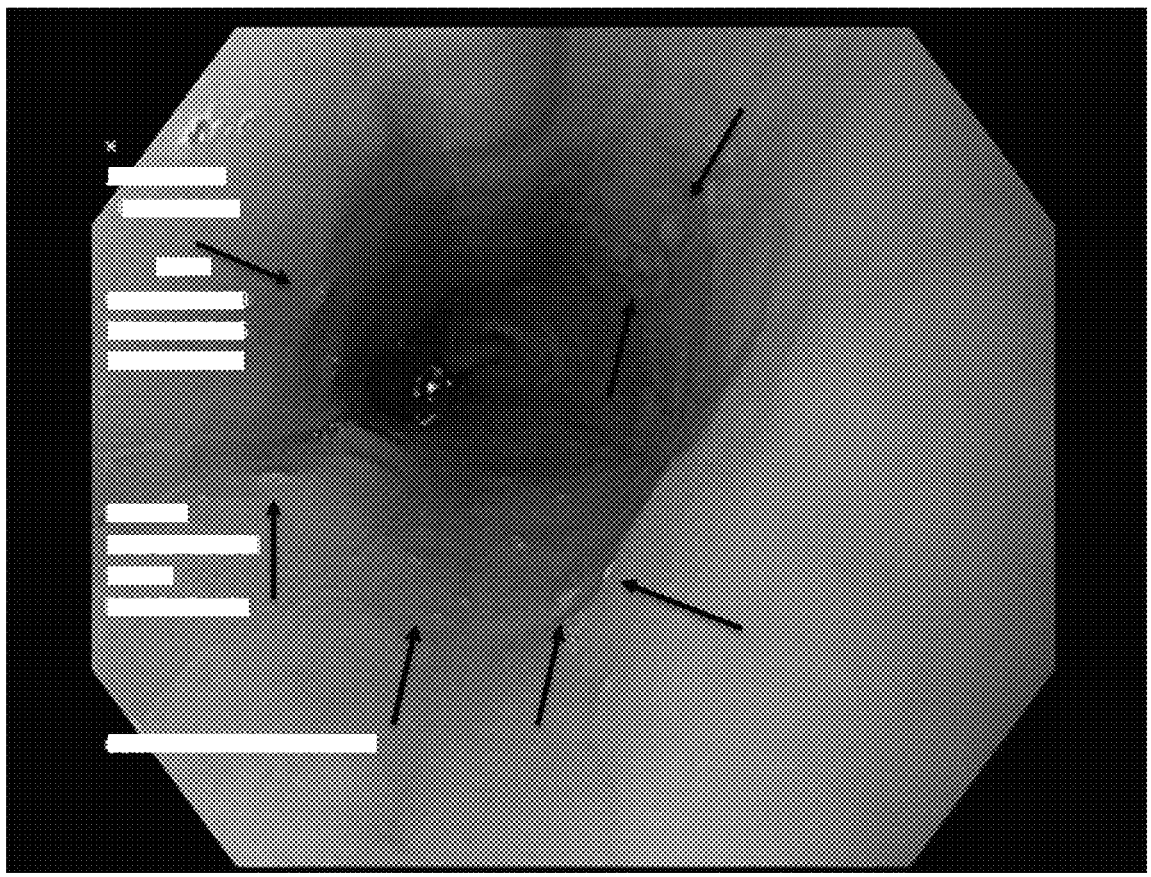
FIG. 2, related to Example 1, shows the initial esophageal endoscopy (prior to treatment with Irsogladine Maleate) of JCC. White mucosa plaques representing superficial eosinophilic micro-abscesses (arrows), which are characterizing the presence of Eosinophilic esophagitis.
Figure 3:
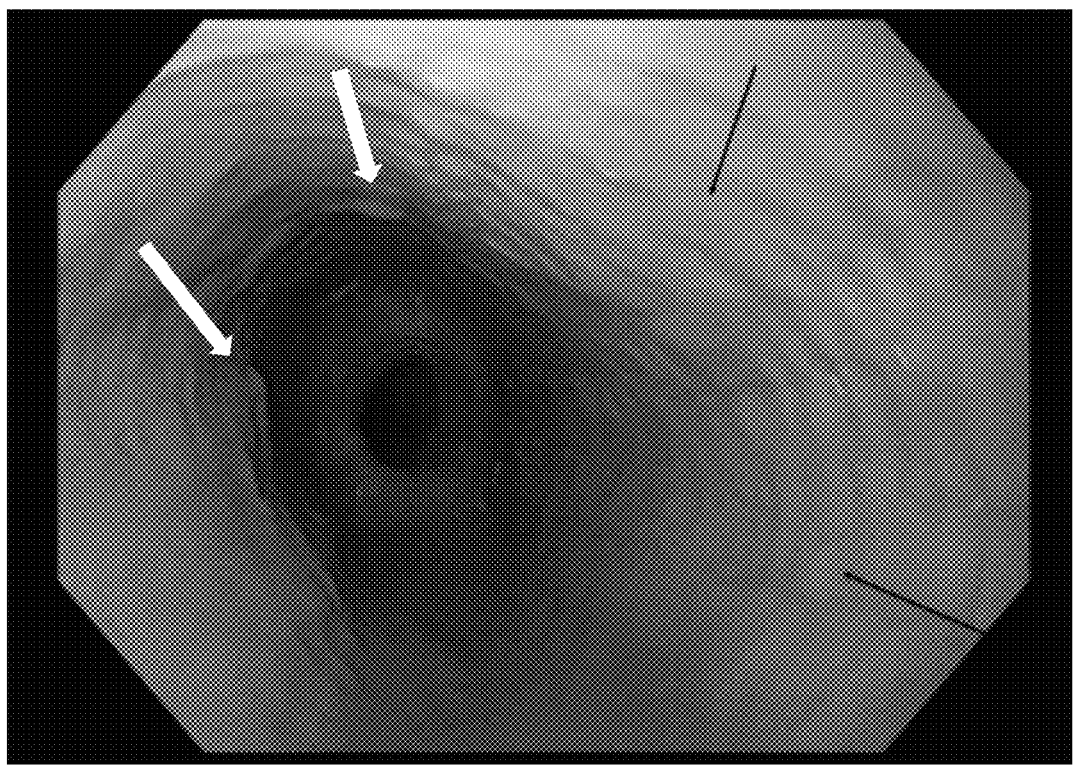
FIG. 3, related to Example 1, shows the Initial esophageal endoscopy (prior to treatment with Irsogladine Maleate) of JCC. Well established Ring Trachealization (black arrows) and white plaques (white arrows) in esophageal mucosa, suggesting that eosinophilic esophagitis has been progressing for a long period.

At that moment in time, a gastrointestinal upper endoscopic examination was also performed, showing in the esophagus mucosa edema with linear furrows (arrows FIG. 1), white mucosa plaques suggesting sub-epithelial abscesses (arrows FIG. 2), trachealization (arrows FIG. 3) and white plaques (arrows FIG. 2-3). No hiatus hernia was observed and the rest of organs examined (stomach, duodenum and upper jejunum) showed a endoscopic normal -looking mucosa. These features are highly suggestive of Eosinophilic Esophagitis (Hirano I, Moy N, Heckman M G, Thomas C S, Gonsalves N, Achem S R. Endoscopic assessment of the oesophageal features of eosinophilic oesophagitis: validation of a novel classification and grading system. *Gut.* 2013; 62 (4):489-495; Muir A B, Merves J, Liacouras C A. Role of Endoscopy in Diagnosis and Management of Pediatric Eosinophilic Esophagitis. *Gastrointest Endosc Clin N Am.* 2016; 26 (1):187-200).

Figure 4:
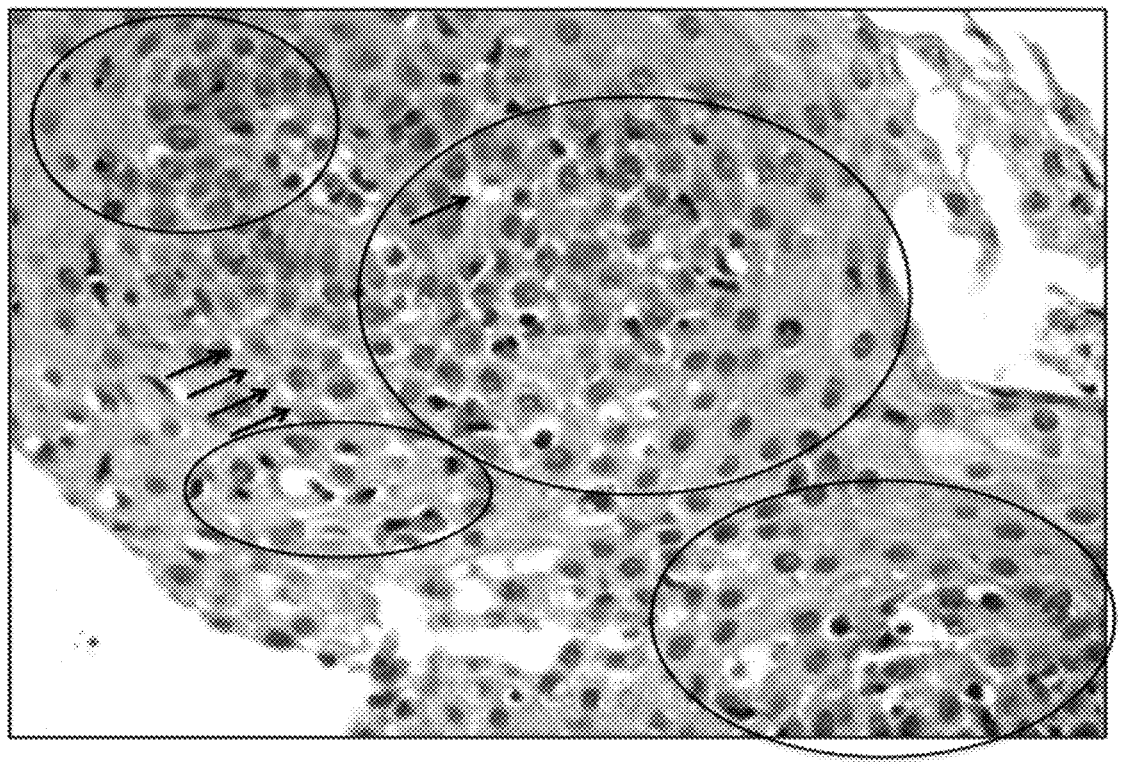
FIG. 4, related to Example 1, shows an increased number of eosinophils infiltrating the esophageal mucosa (red cells within circles in the picture in color) of JCC in the initial biopsy—prior to treatment with Irsogladine maleate, accounting for more than 30 per HPF (High Power Field), together with widely open intercellular spaces (arrows). This characterizes the histological features of Eosinophilic Esophagitis.

Simultaneously, biopsies were taken in all organs examined. Esophageal biopsies showed significant eosinophil infiltration (more than 30 cells per HPF, shown as red stained cells in the colored picture) together with widely dilated intercellular spaces (FIG. 4). Biopsies met the histological criteria of active eosinophil esophagitis (Lee S, de Boer W B, Naran A, et al. More than just counting eosinophils: proximal oesophageal involvement and subepithelial sclerosis are major diagnostic criteria for eosinophilic oesophagitis. *J Clin Pathol.* 2010; 63 (7):644-647; Collins M H, Capocelli K, Yang G Y. Eosinophilic Gastrointestinal Disorders Pathology. *Front Med (Lausanne).* 2018; 4:261). Gastric, duodenal and upper jejunal biopsies were reported as normal.

No features suggesting fungi infection were observed neither in the endoscopy nor in the esophageal biopsy in JJC.

Consequently, JJC was diagnosed with active eosinophlic esophagitis. At this point in time, JJC was treated with oral Irsogladine maleate tablets, 2 mg twice a day during 12 weeks, exempting JJC from other therapies.

At the end of the Irsogladine treatment, JJC was evaluated again. Symptoms had disappeared and JJC tolerated food and swallowed it without any pain or difficulty.

Figure 5:
FIG. 5, related to Example 1, shows esophageal endoscopy of JCC in Narrow Band Imaging technique after 12 weeks of treatment with Irsogladine Maleate. Mucosa white plaques and circular trachealization disappeared relative to initial endoscopy, demonstrating the non-existence of endoscopic lesions of eosinophilic esophagitis.

Also, at end of the Irsogladine treatment, endoscopic examination was repeated using Narrow Band Imaging (NBI). This technique is able to detect minimal changes in mucosa surface. FIG. 5 depicts the NBI images of endoscopies showing that esophageal mucosal furrows, white plaques and trachealization lesions had disappeared after treatment with Irsogladine.

Figure 6:
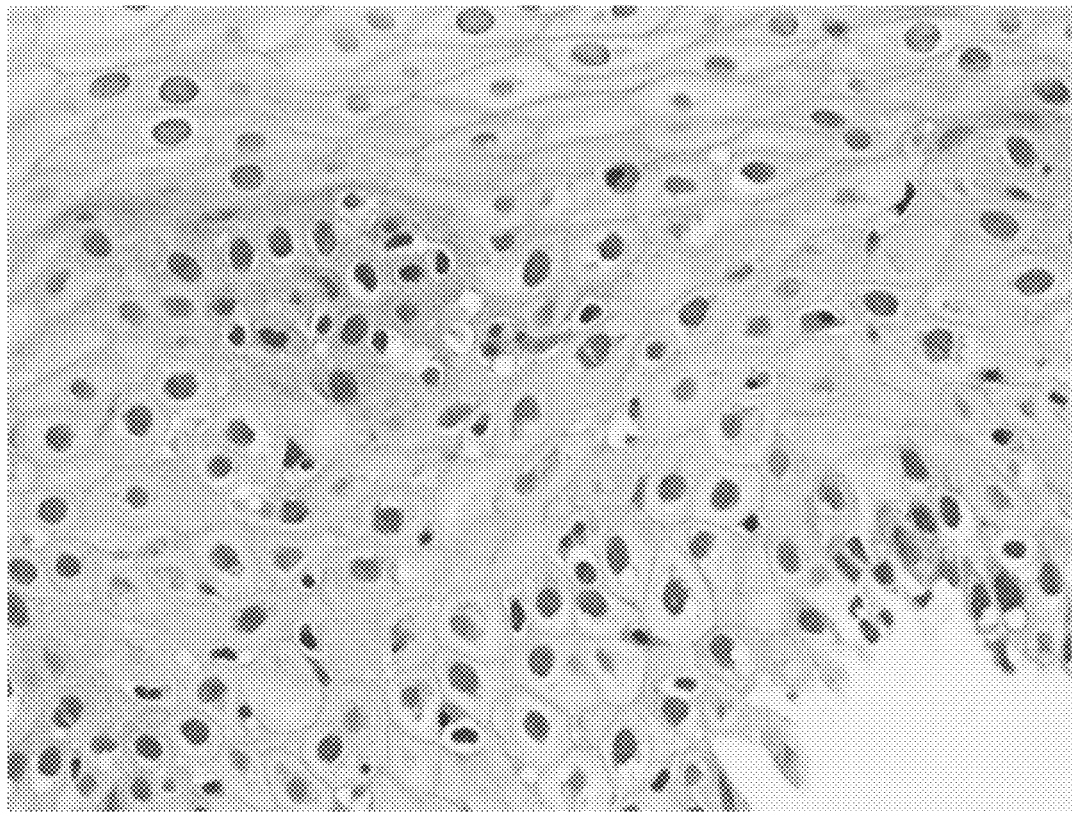
FIG. 6, related to Example 1, shows esophageal biopsy of JCC viewed under high power field (HPF) after 12 weeks of treatment with Irsogladine Maleate. Eosinophil infiltration has clearly reduced, and intercellular spaces are back to normal, demonstrating the non-presence of histologic features of Eosinophilic esophagitis in JCC.

Finally, biopsies of the esophageal mucosa were also obtained at the end of Irsogladine treatment, showing an almost complete disappearance of eosinophil infiltration (eosinophil counts less than 5 per HPF) and no dilation of intercellular spaces (FIG. 6) (i.e. this is the normal architecture of esophageal mucosa). Therefore, the treatment of EoE with Irsogladine resulted in a reduction of eosinophilic infiltration below the threshold defining aberrant eosinophil infiltration in esophageal mucosa in EoE (i.e. threshold is 15 counts per HPF) and being therapeutically effective in inducing disease remission (symptoms had disappeared and the esophagus was endoscopically and histologically normal). No side effects related Irsogladine administration were observed.

Example 2

Example 2 solely refers to the diagnostics and treatment of a 24 years old human male named as JPV diagnosed with Eosinophilic Esophagitis (EoE) as a result of the following observations. JPV complained for more than 6 months of non-specific, almost continuous abdominal pain of moderate intensity especially in the upper abdomen eventually accompanied of nausea. An abdominal ultrasound performed at that time to JPV showed a unique gallstone, without any other data. An Enteric Magnetic Resonance Imaging showed no abnormalities, signs of gastro-intestinal inflammation, increased wall thickness or strictures. Pain tended to increase while eating.

Additional blood tests did not show any relevant data and no peripheral eosinophilia (253 cell $mm^3$) was shown. Liver function tests, serum iron, ferritin levels, C-Reactive Protein and fecal calprotectin were normal. There were no intestinal parasites (3 separate day stool examinations).

Figure 7:
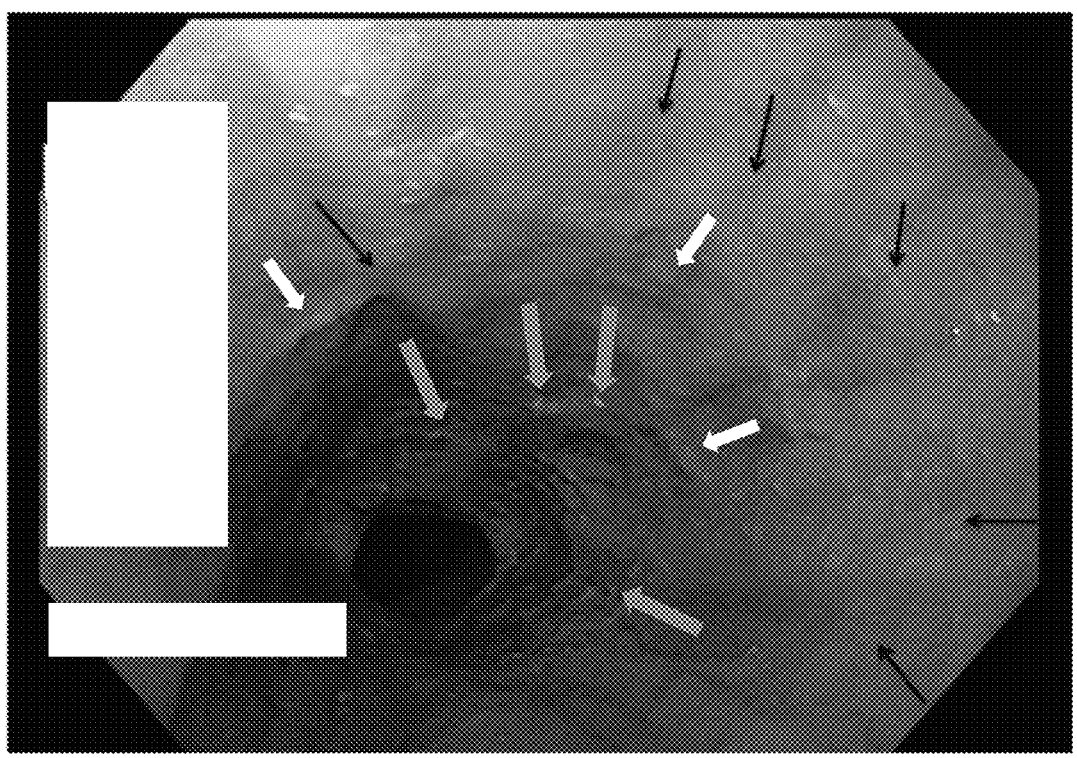
FIG. 7, related to Example 2, shows the initial esophageal endoscopy (prior to Irsogladine Maleate treatment) of JPV. Esophageal mucosa shows linear furrows (black arrows), white plaques (grey arrows) and a tendency to trachealization (circular folds pointed with white arrows). These findings are in agreement of diagnostic of eosinophilic esophagitis.

Endoscopic procedures were performed. Colonoscopy of the entire colon and 20 cm of the distal ileum were informed as normal and staged biopsies were taken. Upper gastrointestinal endoscopic examination showed in the oesophagus endoscopic features in concordance with the endoscopic criteria of suspicion of Eosinophilic Esophagitis, which are: mucosa edema with linear furrows, white plaques with confluent tendency, and trachealization; no hiatus hernia was observed (FIG. 7). Other organs of the upper gastrointestinal tract (stomach, duodenum and upper jejunum) were endoscopically normal. Biopsies were taken in all upper gastrointestinal tract organs examined. Both, clinical symptoms and endoscopic findings are in accordance with the clinical and endoscopic criteria of EoE (Lucendo A J, Molina-Infante J, Arias Á, et al. Guidelines on eosinophilic esophagitis: evidence-based statements and recommendations for diagnosis and management in children and adults. *United European Gastroenterol J*. 2017; 5 (3):335-358; Dellon E S, Liacouras C A, Molina-Infante J, et al. Updated International Consensus Diagnostic Criteria for Eosinophilic Esophagitis: Proceedings of the AGREE Conference. *Gastroenterology*. 2018; 155 (4):1022-1033.e10.; Lipowska AM, Kavitt R T. Current Diagnostic and Treatment Strategies for Eosinophilic Esophagitis. *Gastroenterol Hepatol* (N Y) 2017; 13 (9):527-535; Hirano I, Moy N, Heckman M G, Thomas C S, Gonsalves N, Achem S R. Endoscopic assessment of the oesophageal features of eosinophilic oesophagitis: validation of a novel classification and grading system. *Gut*. 2013; 62 (4):489-495; Muir A B, Merves J, Liacouras C A. Role of Endoscopy in Diagnosis and Management of Pediatric Eosinophilic Esophagitis. Gastrointest Endosc *Clin N Am*. 2016; 26 (1):187-200).

Figure 8:
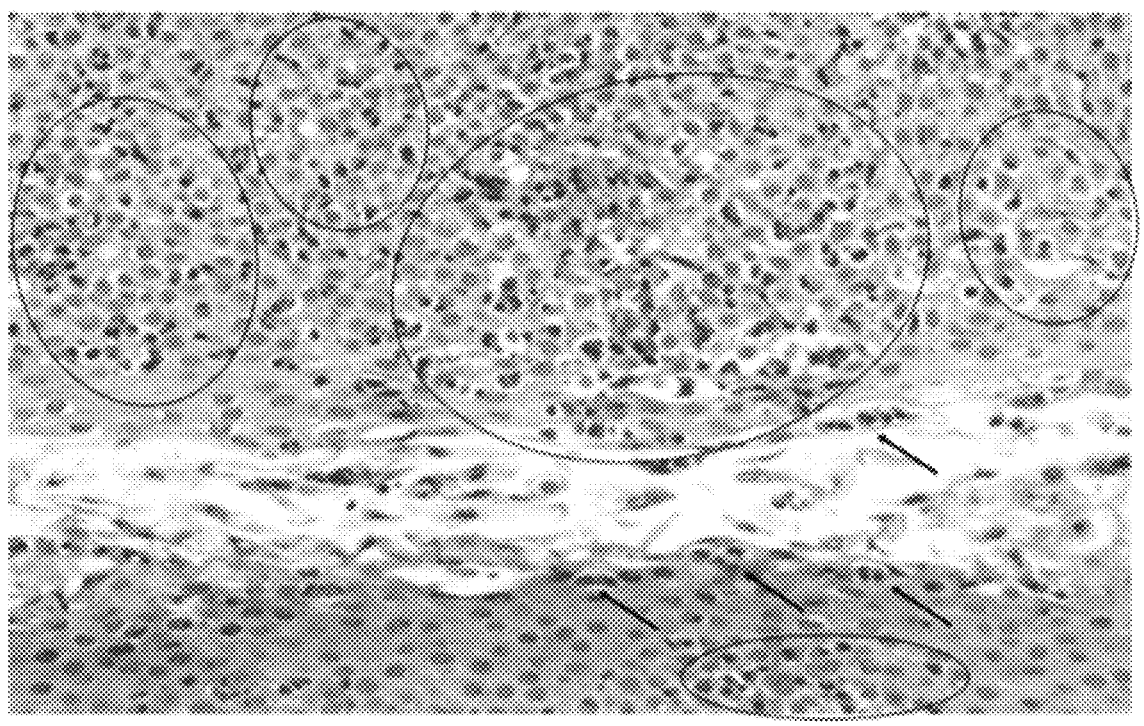
FIG. 8, related to Example 2, shows the initial esophageal biopsy (prior to Irsogladine Maleate treatment) of JPV. The picture in color shows dense infiltrate with eosinophils (red spots/cells) highlighted with circles and sub-epithelial eosinophilic micro-abscesses (arrows). Findings are in agreement with the diagnostic criteria for eosinophilic esophagitis.

Biopsies of esophageal mucosa of JPV showed dense eosinophil infiltrate in the lamina propria and intraepithelial, with >50 cells per HPF (shown as red stained cells in the colored picture), with subepithelial eosinophilc microabscesses and dilated intercellular spaces (FIG. 8). These biopsies meet the diagnostic criteria of Eosinophilic Esophagitis (Lee S, de Boer W B, Naran A, et al. More than just counting eosinophils: proximal oesophageal involvement and subepithelial sclerosis are major diagnostic criteria for eosinophilic oesophagitis. *J Clin Pathol*. 2010; 63 (7):644-647; Collins M H, Capocelli K, Yang G Y. Eosinophilic Gastrointestinal Disorders Pathology. *Front Med* (*Lausanne*). 2018; 4: 261).

No features suggesting fungi infection were observed neither in the endoscopy nor the biopsy of JPV. Gastric, duodenal and upper jejunal, as well as colonic and ileal biopsies were informed as normal.

Since no other cause of eosinophilic esophageal mucosa infiltration was found, the diagnostic of Eosinophilic Esophagitis was established.

Upon confirming the diagnosis with Eosinophilic Esophagitis, JPV was treated with 4 mg of oral Irsogladine maleate twice a day for 8 weeks, without following any other treatment such as food elimination or pharmaceutical treatments (i.e. corticosteroids or monoclonal antibodies).

Figure 9:
FIG. 9, related to Example 2, shows the esophageal endoscopy of JPV after 8 weeks of treatment with Irsogladine Maleate. Esophageal linear furrows, white plaques and a tendency to trachealization have disappeared, indicating that JPV is in endoscopic remission of eosinophilic esophagitis.
Figure 10:
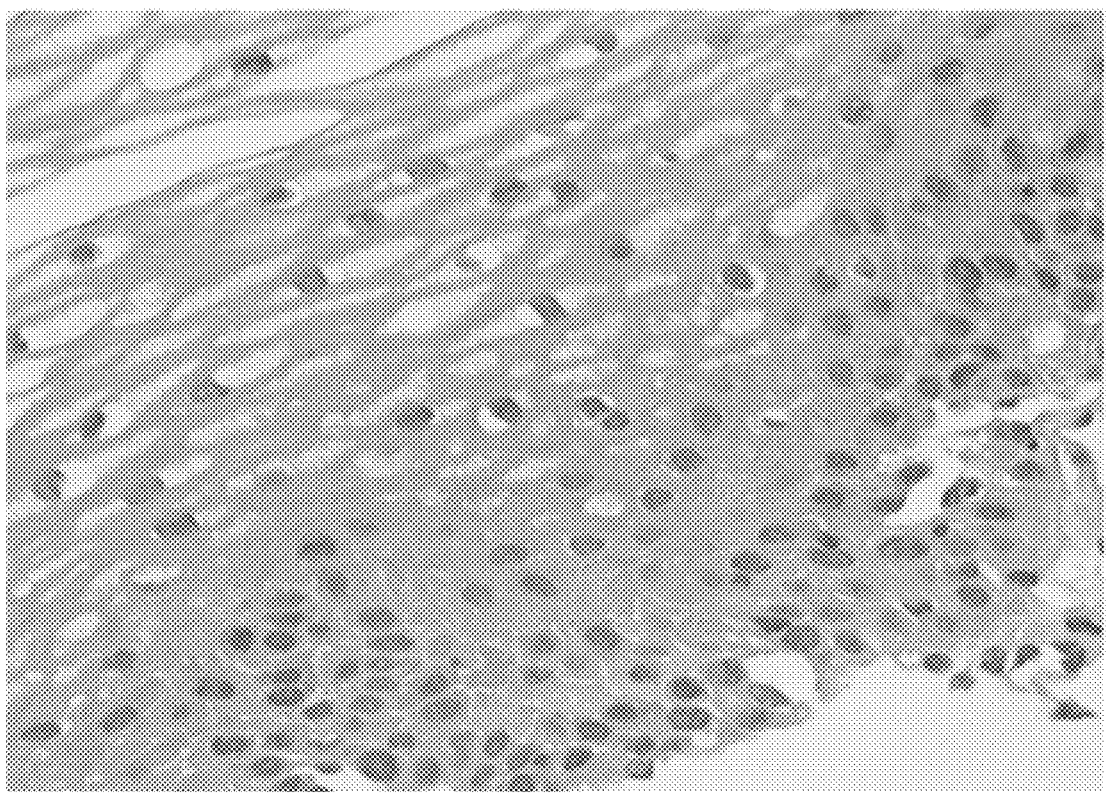
FIG. 10, related to Example 2, shows the High-Power Field (HPF) view of the biopsy of esophageal mucosa after 8 weeks of treatment to JPV with Irsogladine Maleate. The absence of eosinophil infiltration (red cells in the colored picture) in esophageal mucosa is a consequence of treatment of patient with Irsogladine Maleate, indicating that JPV is in remission of eosinophilic esophagitis.

After 8 weeks of treatment with Irsogladine, the symptoms observed prior to treatment completely disappeared. The esophageal mucosa was endoscopically normal (FIG. 9) and the esophageal biopsy shows negligible presence of eosinophil infiltration (FIG. 10). The treatment resulted in a reduction of eosinophil counts from more than 50 per HPF before treatment to less than 15 per HPF after Irsogladine treatment, with no eosinophilic microabscesses and absence of intercellular dilated spaces in the esophageal mucosa (FIG. 10). The treatment resulted therapeutically effective to induce remission in Eosinophilic Esophagitis. No side effects related Irsogladine administration were observed.

Figure 11:
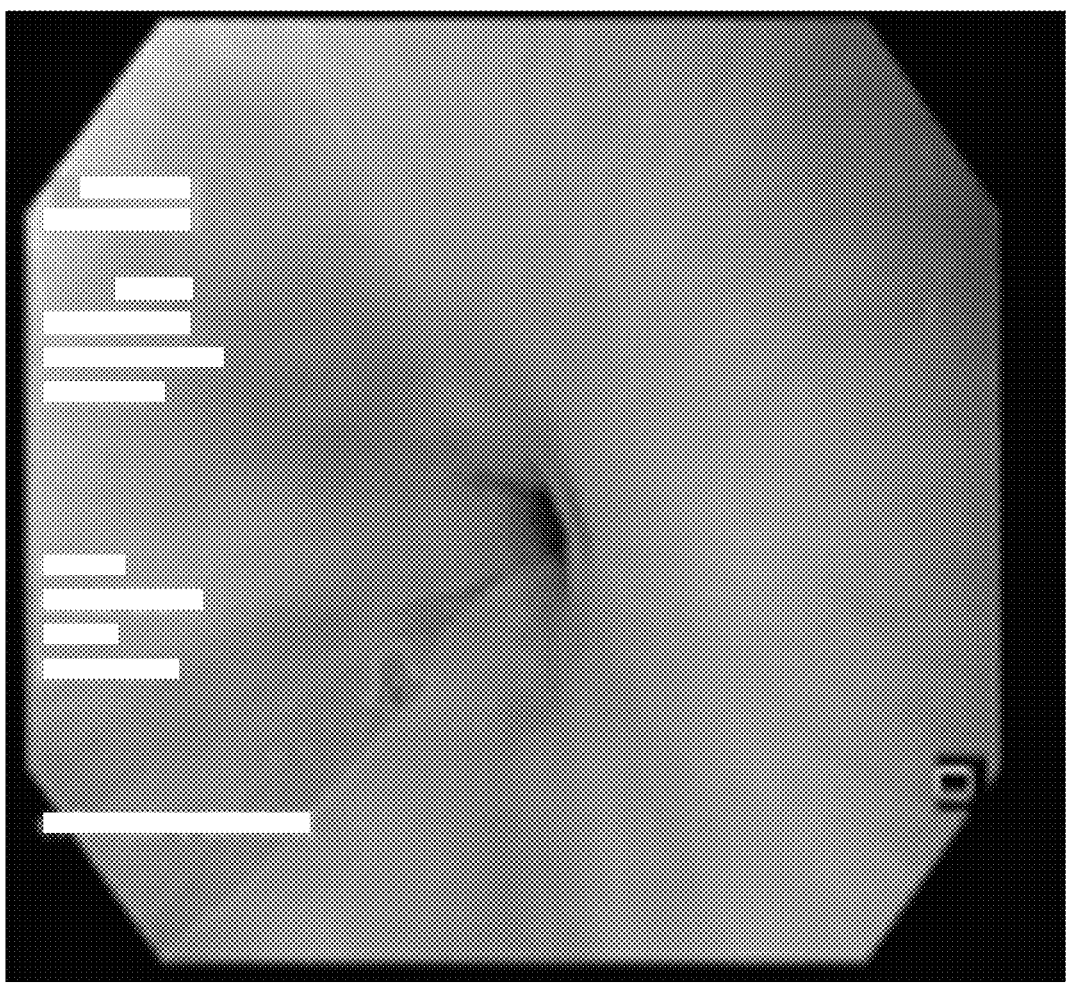
FIG. 11, related to example 2, shows the esophageal endoscopy of JPV at 32 weeks of treatment with Irsogladine Maleate. The endoscopic aspect of the esophageal mucosa is normal, suggesting that eosinophilic esophagitis is in endoscopic remission.
Figure 12:
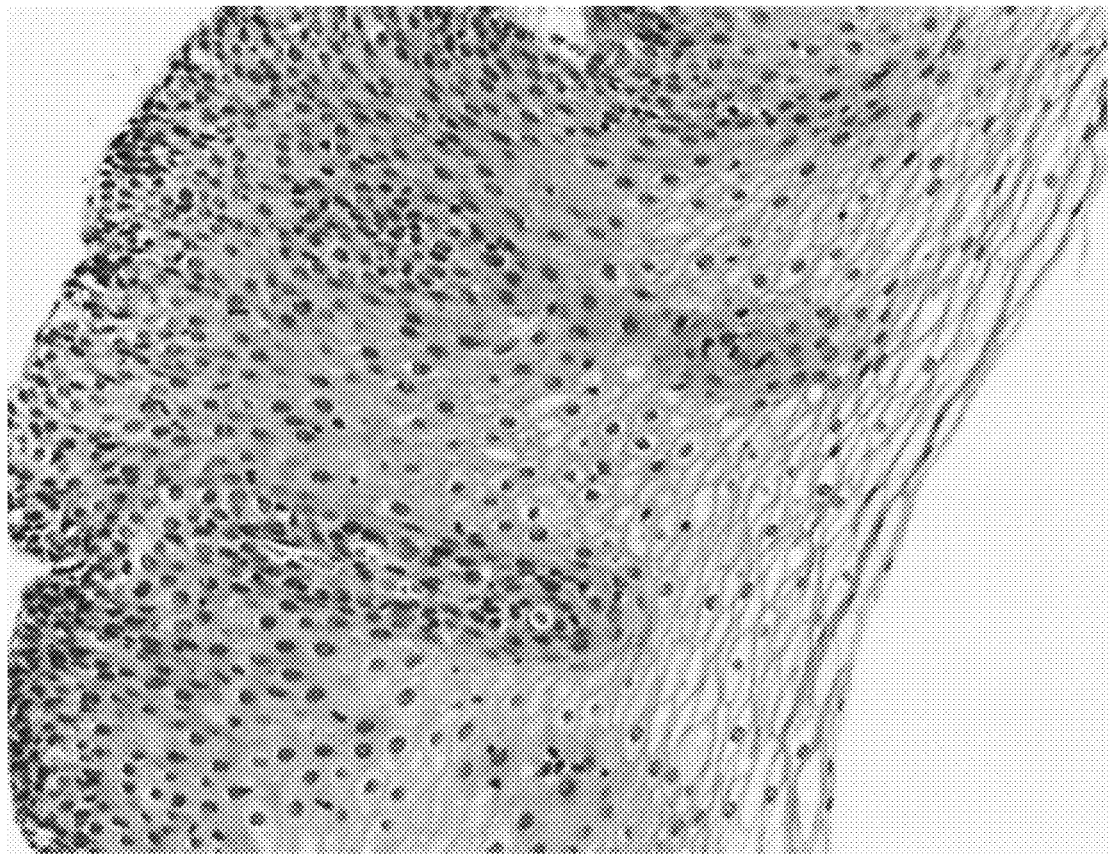
FIG. 12 related to example 2 shows the High-Power Field (HPF) view of the biopsy of the esophageal mucosa of JPV taken at 32 weeks of treatment with Irsogladine Maleate. Histological aspect of the mucosa is strictly normal and no eosinophil infiltration or other inflammatory traits are observed, confirming that Eosinophilic esophagitis is in histologic remission.
Figure 13:
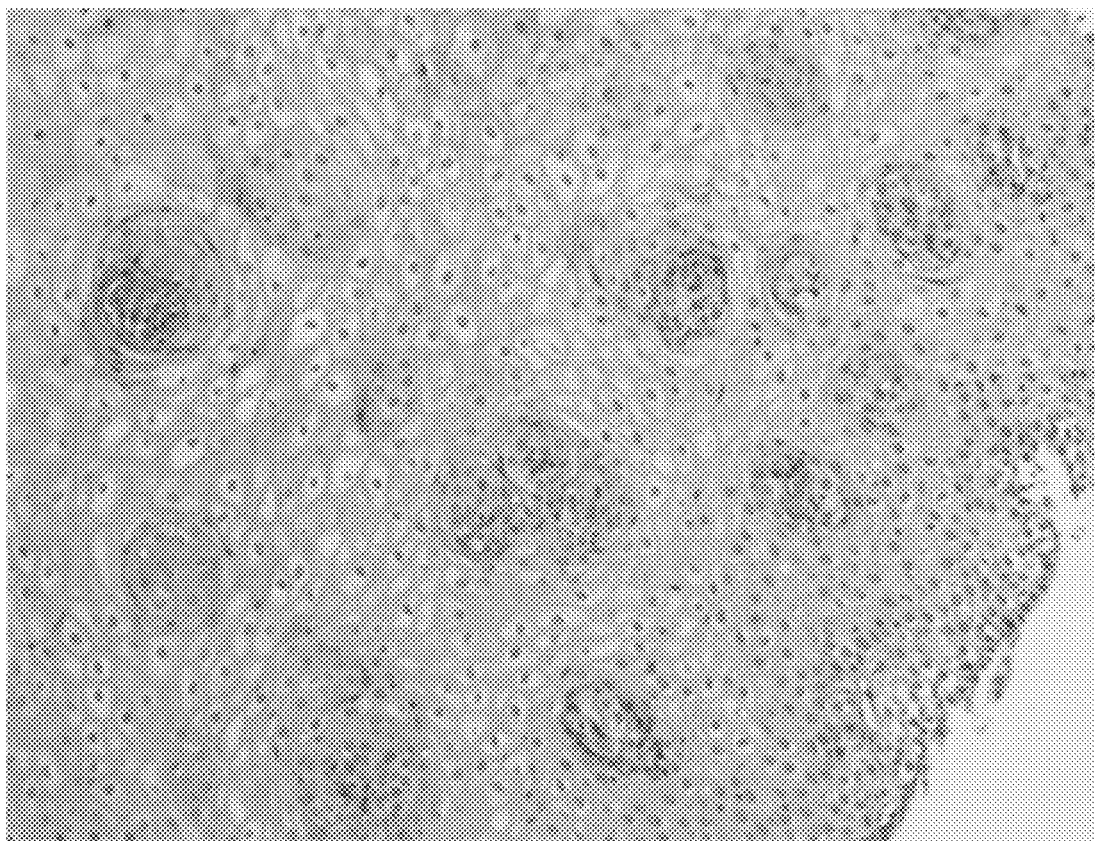
FIG. 13 related to example 2 shows a closer view of the previous biopsy of the esophageal mucosa of JPV taken at 32 weeks of treatment with Irsogladine Maleate. Histological aspect of the mucosa is strictly normal and no eosinophil infiltration or other inflammatory traits are observed, ratifying that Eosinophilic esophagitis is in histologic remission.

Due to the therapeutic efficacy shown by Irsogladine administration, it was decided to prolong JPV treatment for an additional 24 weeks (in total 32 weeks), at the same dose, with regular telephone and presential checking of symptoms and general health. After 24 weeks a new endoscopy was performed, showing a normal looking mucosa of the esophagus (FIG. 11). Esophageal biopsies were taken showing no excess of eosinophil infiltrate (<10 cells/hpf) (FIGS. 12 and 13). There was neither peripheral blood eosinophilia (315 cells $mm^3$) nor anemia or any biological signs of inflammation. No side effects related to the long-term Irsogladine administration were observed or reported.

Example 3

CGB is a 74 years old lady without other medical previous history than mild hypertension treated with ACE-2 inhibitors, otherwise with no gastrointestinal complains and regular normal bowel habits until the previous 8 months. By that time, she began experiencing sensation of early satiety, epigastric fullness after meals, abdominal bloating inducing what she considered increased passing of flatus and intermittent episodes of loose stools. These episodes became more frequent in the following months. She had not fever, inappetence or weight loss. Symptomatic treatment was started with Proton Pump Inhibitors, (Omeprazole 20 mg twice a day) and Mebeverine Chlorhydrate 200 mg. also twice daily during long periods with no improvement. In the last two months the symptoms got worse with exaggerated abdominal bloating, especially after meals, extremely frequent flatus, passing daily one or two loose explosive bowel actions, with no blood and without urgency. An upper G-I endoscopy considered that oesophagus, stomach and duodenum and upper jejunum were normal. The Urease Test for Helicobacter pylori was negative. Other biopsies were not taken.

Because of the symptoms, she diminished food intake and lost 2 kg in the previous month, but with this maneuver she did not improve. The patient had not been traveling abroad in the last 12 months. No history of asthma, atopies or diabetes.

She attended a new clinic because of persistence of symptoms. Clinical examination was normal except for distended abdomen, tympanic, with exaggerated borborygmi. No mases or enlarged organs were felt and the digital rectal examination was considered normal. No abnormalities were found in routine blood tests including hematology lipid, glucose and iron metabolism, liver, renal and thyroid function. CRP was just above the upper normal limit (5.5 over 5.0). An enteric Magnetic Resonance Imaging was informed as normal with no signs of inflammation, wall thickness or stenosis in the gastro-intestinal tract. Stool culture and parasites investigation (three consecutive days samples) were negative.

Figure 14:
FIG. 14, related to example 3. Upper gastrointestinal endoscopy of patient CGB showing a normal jejunal mucosa prior to treatment with Irsogladine maleate, in the moment the patient showed the described symptoms.
Figure 15:
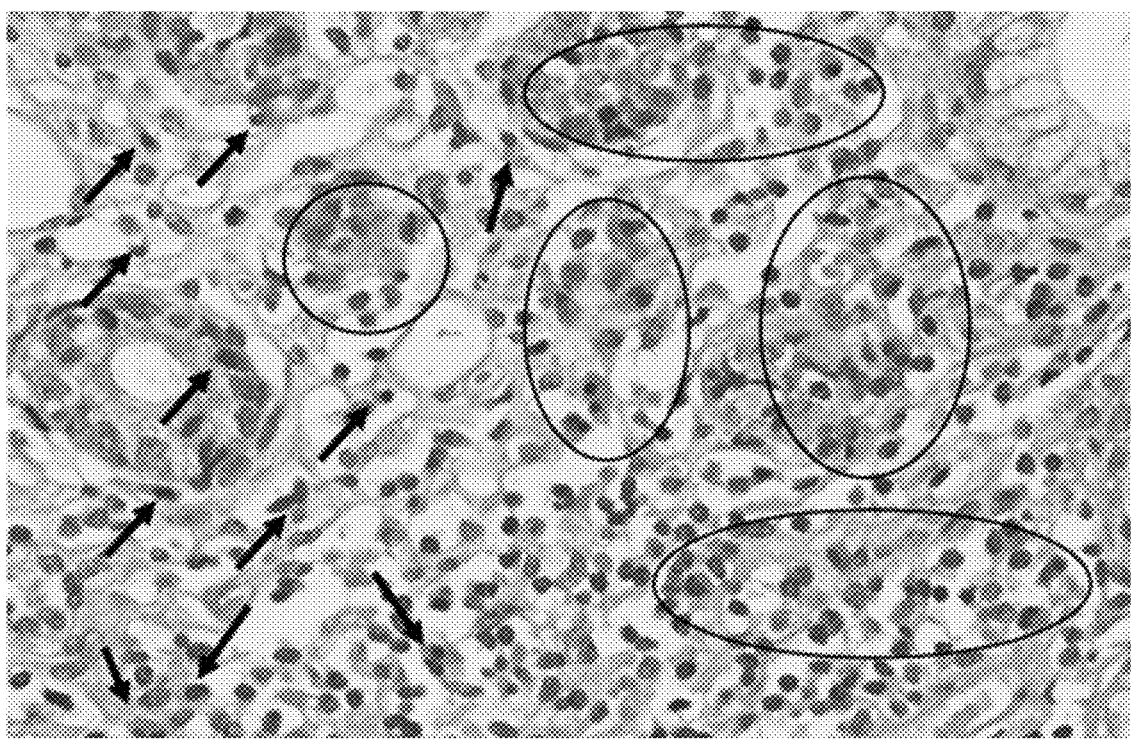
FIG. 15, related to example 3. A high-power field (HPF) image of endoscopic biopsy of the jejunal mucosa of patient CGB prior to treatment of Irsogladine maleate, when the subject was suffering from the symptoms described. The image shows an increased number of eosinophilic cells in the lamina propria: 27-30 per HPF (circles and arrows) of the upper jejunal mucosa, indicating an excess of eosinophils per HPF relative to normal.

New upper G-I endoscopy and colonoscopy were informed as normal (FIG. 14), however biopsies were taken at oesophagus, stomach, duodenum and upper jejunum, as well as in different segments of the entire colon. The only histological abnormality reported was the presence in the upper portion of the jejunum of a moderate mucosa infiltrate with increased number eosinophils, 27-30 cells per hpf (high power field) (FIG. 15) No other abnormalities (parasites), MARSH-like lesions, macrophage infiltration, lymphangiectasia or histo-morphological signs of malignancy were observed. The diagnostic of mild eosinophilic jejunitis was established (Collins M H, Capocelli K, Yang G Y. Eosinophilic Gastrointestinal Disorders Pathology. *Front Med (Lausanne)*. 2018; 4:261; Silva J, Canão P, Espinheira M C, Trindade E, Carneiro F, Dias J A. Eosinophils in the gastrointestinal tract: how much is normal?. *Virchows Arch*. 2018; 473 (3):313-320)

Treatment with Irsogladine maleate 4 mg twice a day was prescribed, without other medication than ACE-2 inhibitors for hypertension. After 2 weeks, symptoms improved, stools became less loose and abdominal distension and flatus production decreased. After 4 weeks, the patient was fully asymptomatic, passing a normal looking stool once daily. The dose of Irsogladine maleate was diminished to 4 mg once a day.

Figure 16:
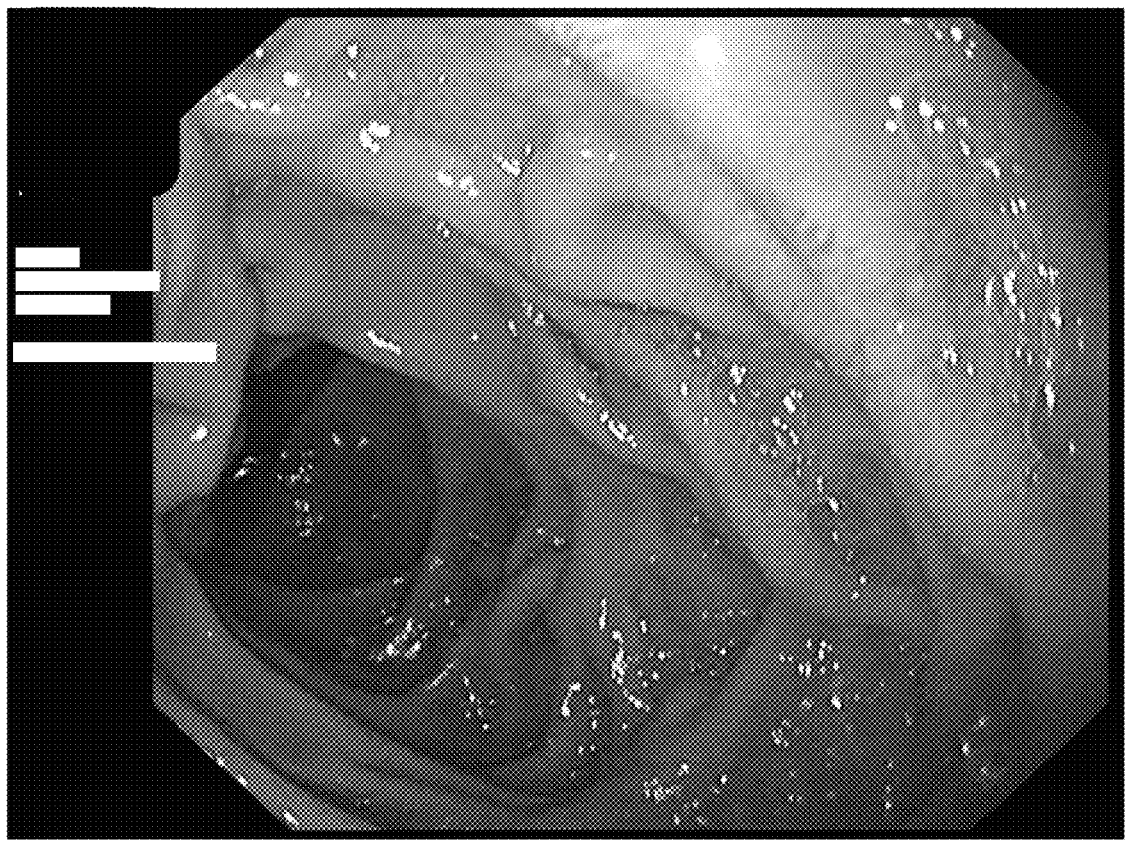
FIG. 16, related to example 3. Upper gastrointestinal endoscopy of patient CGB after six months of daily treatment with Irsogladine maleate showing a normal looking upper jejunal mucosa.
Figure 17:
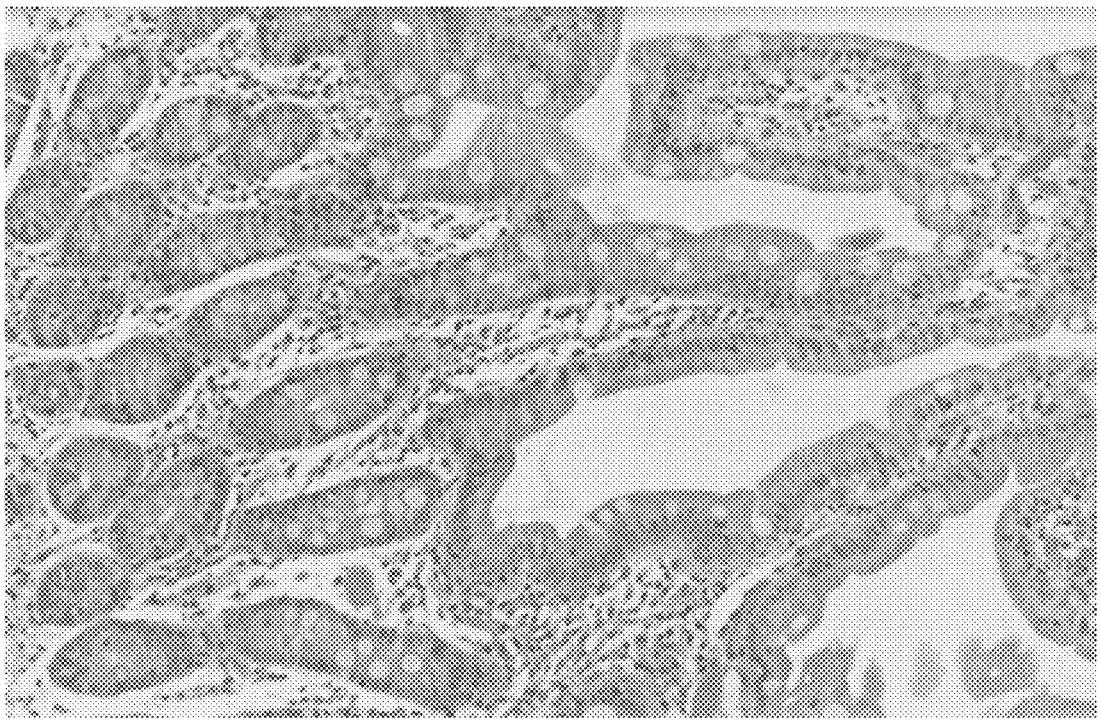
FIG. 17, related to example 3. An endoscopic biopsy of the upper jejunal mucosa of patient CGB after six months of daily treatment with Irsogladine maleate showing normal looking villi and no increase of eosinophilic infiltration in the lamina propria.
Figure 18:
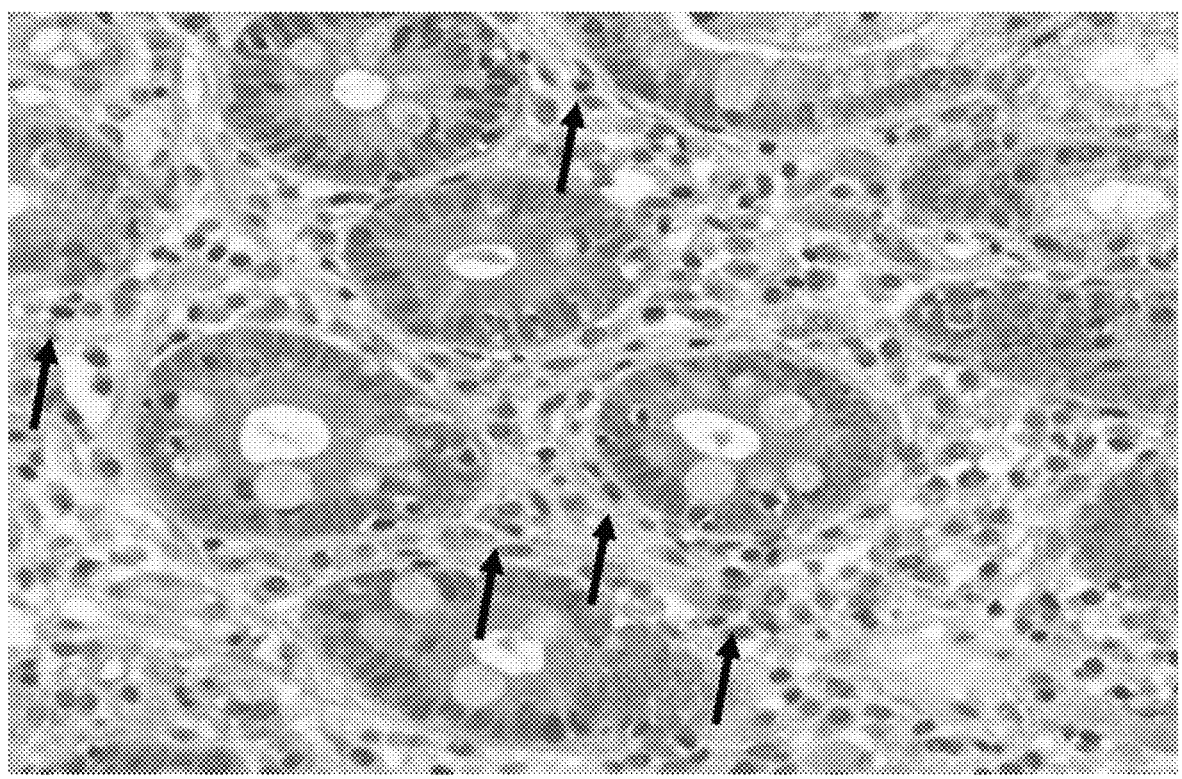
FIG. 18, related to example 3. High-power field (HPF) image of an endoscopic biopsy of the upper jejunal mucosa of patient CGB after six months treatment with Irsogladine maleate, showing no signs of inflammation and few scattered number of eosinophils (arrows), 3 to 5 per HPF in the lamina propria.

After 6 months maintenance treatment with 4 mg of Irsogladine maleate the patient remained asymptomatic and a new gastrointestinal upper endoscopy was performed, which was considered normal (FIG. 16). Biopsies were taken in the upper jejunum in which the moderate excessive inflammatory infiltration had diminished and only 3 to 5 eosinophils per hpf were observed (FIGS. 17 and 18).

Citation List

Assa'ad A H, Gupta SK, Coffins MH, et al. An antibody against IL-5 reduces numbers of esophageal intraepithelial eosinophils in children with eosinophilic esophagitis. *Gastroenterology*. 2011; 141 (5):1593-1604

Atkins D. The Occasional Ebb and Flow between Eosinophilic Esophagitis and IgE-Mediated Food Allergy. *J Allergy Clin Immunol Pract*. 2018; 6 (2):651-652.

Brandtzaeg P. Food allergy: separating the science from the mythology [published correction appears in Nat Rev Gastroenterol Hepatol. 2010 Sep.; 7 (9):478], *Nat Rev Gastroenterol Hepatol*. 2010; 7 (7):380-400

Caldwell J M, Collins M H, Stucke E M, et al. Histologic eosinophilic gastritis is a systemic disorder associated with blood and extragastric eosinophilia, TH2 immunity, and a unique gastric transcriptome. *J Allergy Clin Immunol*. 2014; 134 (5):1114-1124

Clayton F, Fang J C, Gleich G J, et al. Eosinophilic esophagitis in adults is associated with IgG4 and not mediated by IgE. *Gastroenterology*. 2014; 147 (3):602-609

Collins M H, Capocelli K, Yang G Y. Eosinophilic Gastrointestinal Disorders Pathology. *Front Med (Lausanne)*. 2018; 4:261

Dellon E S, Liacouras C A, Molina-Infante J, et al. Updated International Consensus Diagnostic Criteria for Eosinophilic Esophagitis: Proceedings of the AGREE Conference, *Gastroenterology*. 2018; 155 (4):1022-1033. e10.

Foroughi S, Foster B, Kim N, et al. Anti-IgE treatment of eosinophil-associated gastrointestinal disorders. *J Allergy Clin Immunol,* 2007; 120 (3):594-601

Galli S J, Tsai M, Piliponsky A M. The development of allergic inflammation. *Nature*. 2008; 454(7203):445-454

Golekoh M C, Hornung L N, Mukkada V A, Khoury J O, Putnam P E, Backeljauw P F, Adrenal Insufficiency after Chronic Swallowed Glucocorticoid Therapy for Eosinophilic Esophagitis. *J Pediatr*. 2016; 170:240-245

Haas A M, Maune N C, Clinical presentation of feeding dysfunction in children with eosinophilic gastrointestinal disease. *Immunol Allergy Clin North Am*. 2009; 29 (1):65-75

Harbinson P L, MacLeod D, Hawksworth R, et al. The effect of a novel orally active selective PDE4 isoenzyme inhibitor (CDP840) on allergen-induced responses in asthmatic subjects. *Eur Respir J*. 1997; 10 (5):1008-1014

Hirano I, May N, Heckman M G, Thomas C S, Gonsalves N, Achem S R. Endoscopic assessment of the oesophageal features of eosinophilic oesophagitis; validation of a novel classification and grading system. *Gut*. 2013; 62 (4):489-495

Hirano I, Collins M H, Assouline-Dayan Y, et al. RPC4046, a Monoclonal Antibody Against IL13, Reduces Histologic and Endoscopic Activity in Patients With Eosinophilic Esophagitis. *Gastroenterology*. 2019; 156 (3):592-603.e10

Hiremath G, Kodroff E, Strobel M J, et al. Individuals affected by eosinophilic gastrointestinal disorders have complex unmet needs and frequently experience unique barriers to care. *Clin Res Hepatol Gastroenterol*. 2018; 42 (5):483-493

Jawairia M, Shahzad G, Musta chia P. Eosinophilic gastrointestinal diseases: review and update. *ISRN Gastroenterol*. 2012; 2012:463689.

Jensen E T, Martin C F, Kappelman M D, Dellon E S. Prevalence of Eosinophilic Gastritis, Gastroenteritis, and Colitis: Estimates From a National Administrative Database. *J Pediatr Gastroenterol Nutr*. 2016; 62 (1); 36-42

Kim Y J, Prussin C, Martin B, et al. Rebound eosinophilia after treatment of hypereosinophilic syndrome and eosinophilic gastroenteritis with monoclonal anti-IL-5 antibody SCH55700. *J Allergy Clin Immunol*. 2004; 114 (6):1449-1455

Kinoshita Y, Ishimura N, Oshima N, et al. Recent Progress in the Research of Eosinophilic Esophagitis and Gastroenteritis. *Digestion*. 2016; 93 (1):7-12

Kottyan L C, Davis B P, Sherrill J D, et al. Genome-wide association analysis of eosinophilic esophagitis provides insight into the tissue specificity of this allergic disease. *Nat Genet*. 2014; 46 (8):895-900

Lee S, de Boer W E, Naran A, et al. More than just counting eosinophils: proximal oesophageal involvement and subepithelial sclerosis are major diagnostic criteria for eosinophilic oesophagitis. *J Clin Pathol*. 2010; 63 (7):644-647

Lim E J, Lu T X, Blanchard C, Rothenberg M E. Epigenetic regulation of the IL-13-induced human eotaxin-3 gene by CREB-binding protein-mediated histone 3 acetylation. *J Biol Chem.* 2011; 286 (15):13193-13204

Lipowska A M, Kavitt R T. Current Diagnostic and Treatment Strategies for Eosinophilic Esophagitis. *Gastroenterol Hepatol* (N Y). 2017; 13 (9):527-535

Lucendo A J, et al. Budesonide orodispensable tablets are highly effective to maintain clinical-histological remission in adult patients with eosinophilic esophagitis: Results from 48 weeks, double blind, placebo-controlled, pivotal EOS-2 trial: Abstract 951. Gastroenterology, 2019; 156 (suppl 1): S:1509

Lucendo A J, De Rezende LC, Jiménez-Contreras S, et al. Montelukast was inefficient n maintaining steroid-induced remission in adult eosinophilic esophagitis. *Dig Dis Sci.* 2011; 56 (12):3551-3558

Lucendo A J, Molina-Infante J, Arias Á, et al. Guidelines on eosinophilic esophagitis: evidence-based statements and recommendations for diagnosis and management in children and adults. *United European Gastroenterol J.* 2017; 5 (3): 335-358

Mansoor E, Saleh M A, Cooper G S, Prevalence of Eosinophilic Gastroenteritis and Colitis in a Population-Based Study, From 2012 to 2017. *Clin Gastroenterol Hepatol.* 2017; 15 (11):1733-1741

Muir A B, Merves J, Liacouras C A. Role of Endoscopy in Diagnosis and Management of Pediatric Eosinophilic Esophagitis. Gastrointest Endosc Clin N Am. 2016; 26(1): 187-200

Murali A R, Gupta A, Attar B M, Ravi V, Koduru P. Topical steroids in eosinophilic esophagitis: Systematic review and meta-analysis of placebo-controlled randomized clinical trials. *J Gastroenterol Hepatol.* 2016; 31 (6):1111-1119

Netzer P, Gschossmann J M, Straumann A, Sendensky A, Weimann R, Schoepfer A M. Corticosteroid-dependent eosinophilic oesophagitis: azathioprine and 6-mercaptopurine can induce and maintain long-term remission. *Eur J Gastroenterol Hepatol.* 2007; 19 (10):865-869

Nishimura A, Campbell-Meltzer R S, Chute K, Orrell J, Ono S J. Genetics of allergic disease: evidence for organ-specific susceptibility genes. *Int Arch Allergy Immunol.* 2001; 124 (1-3):197-200

Otani I M, Anilkumar A A, Newbury R O, et al. Anti-IL-5 therapy reduces mast cell and IL-9 cell numbers in pediatric patients with eosinophilic esophagitis. *J Allergy Clin Immunol.* 2013; 131 (6)1576-1582

Philpott H, Dellon E S. The role of maintenance therapy in eosinophilic esophagitis: who, why, and how?, *J Gastroenterol.* 2018; 53 (2):165-171

Reed C C, Fan C, Koutlas N T, Shaheen N J, Dellon E S. Food elimination diets are effective for long-term treatment of adults with eosinophilic oesophagitis. *Ailment Pharmacol Ther.* 2017; 46 (9):836-844

Rocha R, Vitor A B, Trindade E, et al. Omalizumab in the treatment of eosinophilic esophagitis and food allergy. *Eur J Pediatr.* 2011; 170 (11):1471-1474

Ruffner M A, Spergel J M. Non-IgE-mediated food allergy syndromes. Ann Allergy Asthma Immunol. 2016; 117 (5):452-454

Silva J, Canaão P, Espinheira M C, Trindade E, Carneiro F, Dias J A. Eosinophils in the gastrointestinal tract: how much is normal?. *Virchows Arch.* 2018; 473 (3):313-320

Simon D, Cianferoni A, Spergel J M, et al. Eosinophilic esophagitis is characterized by a non-IgE-mediated food hypersensitivity. *Allergy.* 2016; 71 (5):611-620

Steinbach E C, Hernandez M, Delion E S. Eosinophilic Esophagitis and the Eosinophilic Gastrointestinal Diseases: Approach to Diagnosis and Management. *J Allergy Clin Immunol Pract.* 2018; 6 (5):1483-1495

Stone K D, Prussin C. Immunomodulatory therapy of eosinophil-associated gastrointestinal diseases. *Clin Exp Allergy.* 2008; 38 (12):1858-1865 van Rhijn B D, Verheij J, Srnout A J, Bredenoord A J. Rapidly increasing incidence of eosinophilic esophagitis in a large cohort. *Neurogastroenterol Motif.* 2013; 25 (1):47-52.e5 van Rhijn B D, Weijenborg P W, Verheij J, et al, Proton pump inhibitors partially restore mucosal integrity in patients with proton pump inhibitor-responsive esophageal eosinophilia but not eosinophilic esophagitis. *Clin Gastroenterol Hepatol.* 2014; 12 (11):1815-23.e2

Walker M M, Potter M, Talley N J. Eosinophilic gastroenteritis and other eosinophilic gut diseases distal to the oesophagus. *Lancet Gastroenterol Hepatol.* 2018; 3 (4):271-280

Wechsler J B, Hirano I. Biological therapies for eosinophilic gastrointestinal diseases. *J Allergy Clin Immunol.* 2018; 142 (1):24-31.e2

Zuo L, Rothenberg M E. Gastrointestinal eosinophilia. *Immunol Allergy Clin North Am.* 2007; 27 (3):443-455

The invention claimed is:

1. A method for treating an eosinophilic gastrointestinal disease, the method comprising administering a therapeutically effective amount of Irsogladine or a pharmaceutically acceptable salt thereof to a human in need thereof.

2. The method according to claim 1, wherein the pharmaceutically acceptable salt is Irsogladine maleate.

3. The method according to claim 1, wherein the eosinophilic gastrointestinal disease is selected from the group consisting of eosinophilic esophagitis, eosinophilic gastritis, eosinophilic gastroenteritis, eosinophilic duodenitis, eosinophilic jejunitis, eosinophilic ileitis, eosinophilic enteritis and eosinophilic colitis.

4. The method according to claim 3, wherein the eosinophilic gastrointestinal disease is eosinophilic esophagitis.

5. The method according to claim 1, wherein the Irsogladine or the pharmaceutically acceptable salt thereof is administered as adjuvant treatment for the eosinophilic gastrointestinal disease.

6. The method according to claim 1, wherein
(a) a daily dose of 0.005-3.0 mg per kg of the human's weight is provided in a single day;
(b) a daily dose of 0.005-3.0 mg per kg of the human's weight is provided each day for a number of in consecutive days; or
(c) a daily dose of 0.005-3.0 mg per kg of the human's weight is provided each day for a number of intermittent days.

7. The method according to claim 1, which is a method for the induction and/or maintenance of remission therapy.

8. The method according to claim 1, wherein the Irsogladine or the pharmaceutically acceptable salt thereof is administered in the form of a pharmaceutical composition together with one or more pharmaceutically acceptable excipients and/or carriers.

9. The method according to claim 1, wherein the Irsogladine or the pharmaceutically acceptable salt thereof is administered in a form selected from the group consisting of an oral pharmaceutical composition, a nasal pharmaceutical composition, a rectal pharmaceutical composition, an intramuscular pharmaceutical composition, an intravenous pharmaceutical composition, and an intratechal pharmaceutical composition, and combinations thereof.

10. The method according to claim 1, wherein the Irsogladine or the pharmaceutically acceptable salt thereof is administered in the form of an oral pharmaceutical composition selected from the group consisting of an oro-dispersable, tablets, powders, fine granules, granules, capsules, troches, mouth wash, mouth spray, chewing gum, gel, and viscous solution pharmaceutical compositions, and combinations thereof.

11. The method according to claim 1, wherein the Irsogladine or the pharmaceutically acceptable salt thereof is administered in the form of a naso-buccal pharmaceutical composition selected from the group consisting of a spray, and an inhalator pharmaceutical composition, and combinations thereof.

12. The method according to claim 1, wherein the Irsogladine or the pharmaceutically acceptable salt thereof is administered concomitantly with one or more of an additional therapeutic agent selected from the group consisting of Mesalazine, Azathioprine, Mercaptopurine, Beclomethasone dipropionate, Budesonide, Fluticasone, Ciclesonide, prednisolone, methyl prednisolone, prednisone, dexamethasone, ebastine, bilastine, Rebamipide, omeprazole, lansoprazole, esomeprazole, rabeprazole, pantoprazole, ranitidine, famotidine, Misoprostol, Montelukast, Infliximab, Adalumimab, Mepolizumab, Resolizumab, Benralizumab, QAX576, Dupilumab, and Omalizumab, and combinations thereof.

13. The method according to claim 1, wherein the Irsogladine or the pharmaceutically acceptable salt thereof is for use as adjuvant treatment in gastrointestinal diseases.

14. A method for treating eosinophilic esophagitis, the method comprising administering a therapeutically effective amount of Irsogladine maleate to a human in need thereof.

* * * * *